United States Patent [19]

Holt et al.

[11] Patent Number: 4,998,945
[45] Date of Patent: Mar. 12, 1991

[54] TRANSPLANTING EQUIPMENT

[75] Inventors: John B. Holt, Bedford; Simon J. Miles, Barton-Le-Clay; Arthur L. Wilkin, Hitchin, all of England

[73] Assignee: National Research Development Corporation, London, England

[21] Appl. No.: 446,562

[22] Filed: Dec. 7, 1989

[30] Foreign Application Priority Data

Dec. 14, 1988 [GB] United Kingdom ................. 8829168
Jul. 7, 1989 [GB] United Kingdom ................. 3915606

[51] Int. Cl.⁵ ............................................. A01G 9/00
[52] U.S. Cl. .................................... 47/1.01; 47/901
[58] Field of Search ............................. 47/90.1, 1.01

[56] References Cited

U.S. PATENT DOCUMENTS

| | | | |
|---|---|---|---|
| 3,655,064 | 4/1972 | Mayar | 47/901 X |
| 3,842,533 | 10/1974 | Mayar | 47/901 X |
| 3,848,360 | 11/1974 | Million | 47/1.01 X |
| 4,020,881 | 5/1977 | Nöthen | 47/901 X |
| 4,159,727 | 7/1979 | Visser | 47/901 X |
| 4,325,200 | 4/1982 | Ovarnström | 47/1.01 |
| 4,408,549 | 10/1983 | Ovarnström | 47/901 X |
| 4,771,569 | 9/1988 | Tolley | 47/1.01 |

FOREIGN PATENT DOCUMENTS

| | | |
|---|---|---|
| 852114 | 10/1960 | Czechoslovakia . |
| 0243264 | 4/1987 | European Pat. Off. . |
| 0286624 | 3/1988 | Fed. Rep. of Germany . |
| 2619555 | 4/1987 | France . |
| 1326464 | 8/1973 | Norway . |
| 1117162 | 6/1968 | United Kingdom . |
| 1396224 | 6/1975 | United Kingdom . |
| 2025193 | 1/1980 | United Kingdom . |
| 2186776A | 2/1987 | United Kingdom . |
| 2186776B | 8/1989 | United Kingdom . |

Primary Examiner—David A. Scherbel
Assistant Examiner—L. J. Watson
Attorney, Agent, or Firm—Cushman, Darby & Cushman

[57] ABSTRACT

Transplanting equipment comprises a line of individual plant pick-up devices, first support means for transversely moving a first row of containers into vertical alignment with the pick-up devices, control means for bringing the pick-up devices into a plant-supporting or plant-releasing mode as appropriate, horizontal drive means operative to bring the pick-up devices into vertical alignment with the containers of a second row having a different center-to-center spacing to the containers of the first row, second support means for transversely moving the second row of containers out of vertical alignment with the pick-up devices, and vertical drive means for moving the pick-up devices towards or away from the first and second support means to allow the support or release of plants by the pick-up devices as determined by the control means.

12 Claims, 19 Drawing Sheets

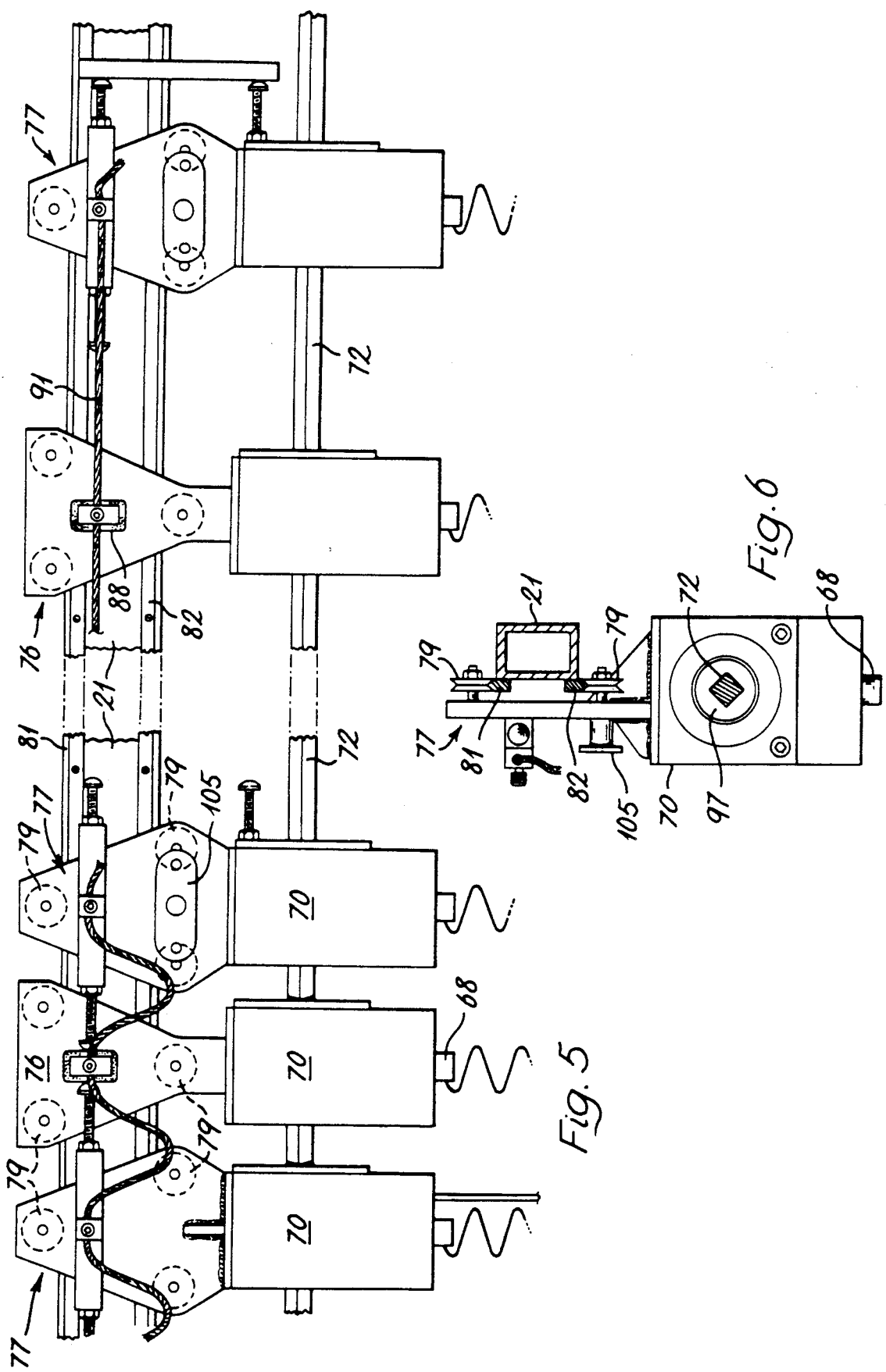

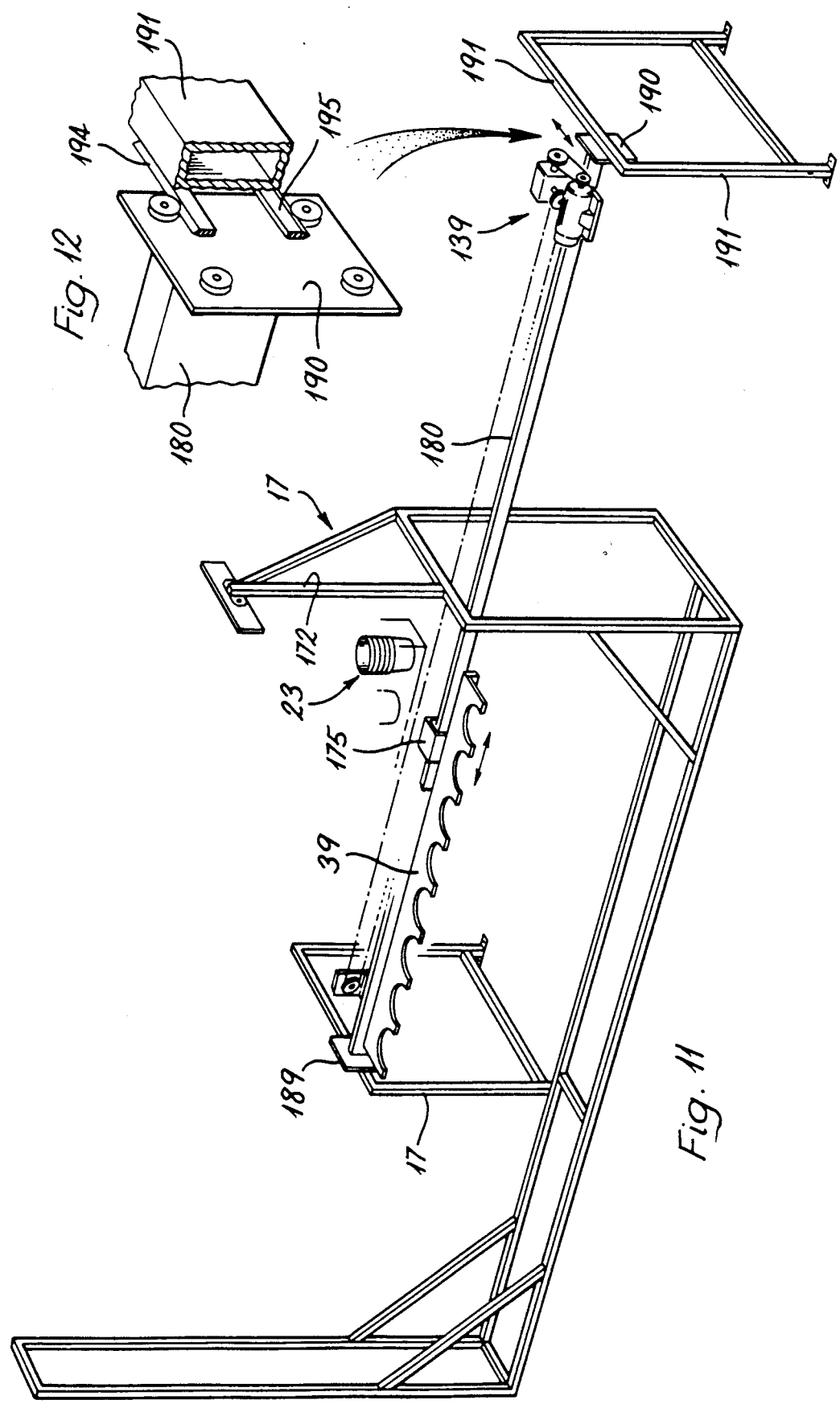

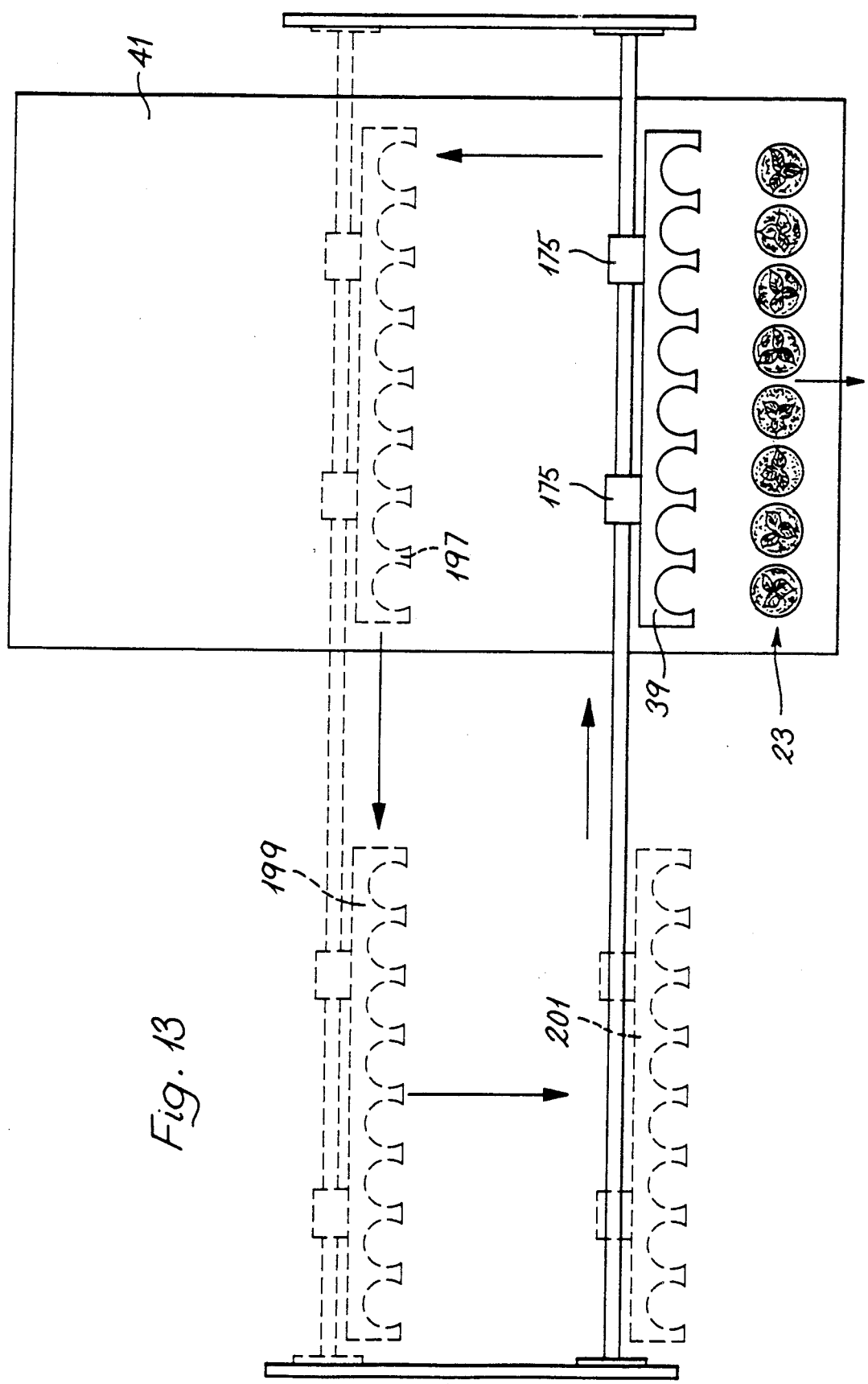

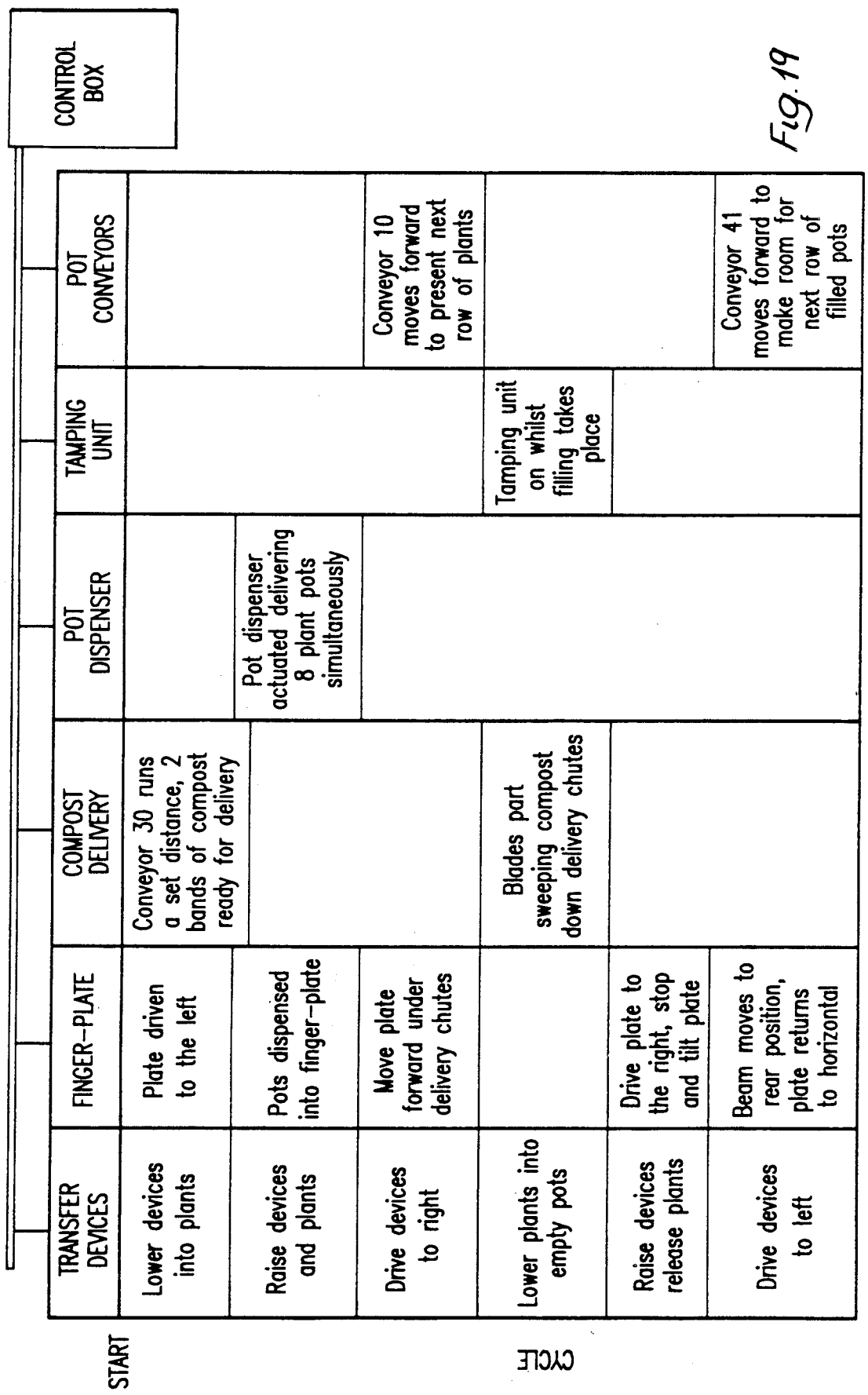

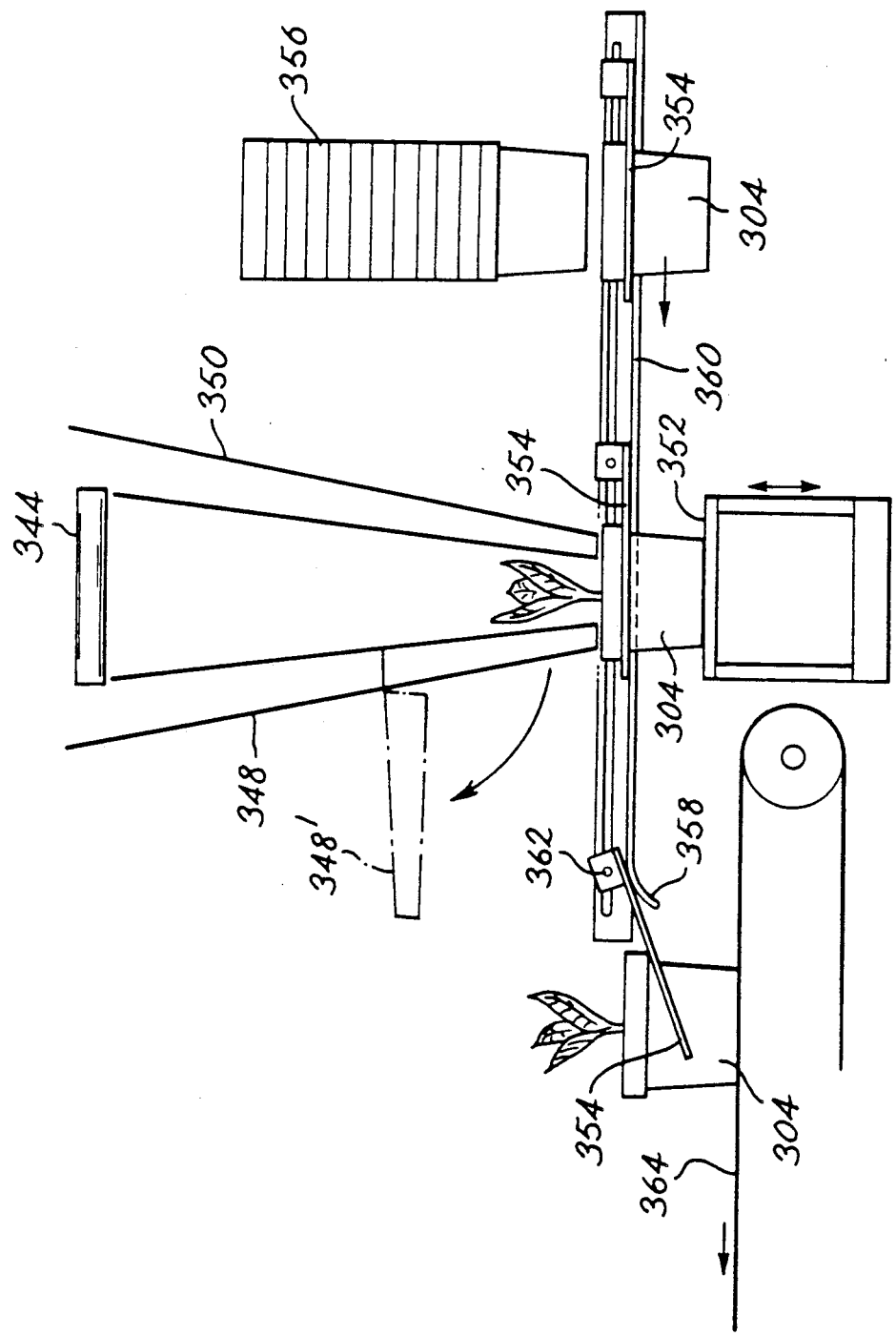

4,998,945

TRANSPLANTING EQUIPMENT

The present invention relates to transplanting equipment and the like.

The invention has a particular application to pots for potted plants i.e. to the semi-rigid plastics or flexible plastics containers in which a wide range of species of plants are commonly grown from seedlings or cuttings.

In some cases it will be necessary to transplant plants from pots of a first size to pots of a larger size and the invention in at least one aspect provides an apparatus capable of doing this automatically or semi-automatically.

According to one aspect of the present invention, there is provided transplanting equipment comprising a line of individual plant pick-up devices, first support means for transversely moving a first row of containers into vertical alignment with the pick-up devices, control means for bringing the pick-up devices into a plant-supporting or plant-releasing mode as appropriate, horizontal drive means operative to bring the pick-up devices into vertical alignment with the containers of a second row having a different centre-to-centre spacing to the containers of the first row, second support means for transversely moving the second row of containers out of vertical alignment with the pick-up devices, and vertical drive means for moving the pick-up devices towards or away from the first and second support means to allow the support or release of plants by the pick-up devices as determined by the control means.

It will be understood that the containers of the first and second rows need not necessarily be provided by a corresponding number of discrete receptacles, it being possible to have a single receptacle providing two or more containers in any one row.

Conveniently, the pick-up devices are of the rotating helix type disclosed in Patent GB 2186776 B.

Conveniently, in this case, the control means comprises a rotary drive operative to rotate the pick-up devices about the helix axes either in the same rotational sense as the helix so as to result in the pick-up devices supporting the plants or in the contrary rotational sense to the helix so as to result in the pick-up devices releasing the plants.

Conveniently, adjacent pick-up devices are interconnected by flexible ties and the horizontal drive means is operative to move the pick-up devices between a bunched slack-tie first configuration corresponding to the centre-to-centre container spacing in one of the two rows and a second taut-tie spaced configuration corresponding to the centre-to-centre container spacing in the other of the two rows.

Alternatively, adjacent pick-up devices have a fixed spacing and the horizontal drive means is operative to move the pick-up devices between selected containers in one of the two rows and similarly centre-to-centre spaced containers in the other of the two rows.

Conveniently, the first support means comprises a first endless conveyor disposed transversely to the line of pick-up devices when at one extreme of their horizontal travel and the second support means comprises a second endless conveyor disposed transversely to the line of pick-up devices when at the other extreme of their horizontal travel.

Conveniently, the transplanting equipment is adapted to transplant plants from containers in the first row into larger size containers in the second row and includes supply means for introducing particulate material into the gaps between the root portions of the plants and the walls of the larger size containers.

Conveniently, the supply means comprises a conveyor operative to convey the particulate material over the containers in the second row, and displacement means operative to displace the particulate material into said containers.

Conveniently, the supply means comprises means for introducing a mixture of particulate material into the gaps between the root portions of the plants and the walls of the larger size containers.

Normally, the particulate material will comprise a mixture of conventional potting material such as compost, or peat etc.

Conveniently, the supply means includes hinged loading chutes which pivot to allow the horizontal withdrawal of the second row of containers after repotting.

Conveniently, the containers in the two rows have a uniform centre-to-centre spacing.

Conveniently, the transplanting equipment of the present invention, includes a pot dispenser system (which is inventive in its own right according to a second aspect of the invention), the pot dispenser system comprising a first support means arranged around a space for the bottom pot of a stack of pots, a second support means arranged around a space for the penultimate pot of the stack, and control means operative sequentially to effect the engagement of the bottom pot by the first support means, the additional engagement of the penultimate pot by the second support means, the disengagement of the first support means from the bottom pot to allow the bottom pot to fall away from the remainder of the stack, the return of the first support means to its previous pot-engaging position and the release by the second support means of what initially had been the penultimate pot of the stack thereby to allow the stack of pots to drop until said previously penultimate pot is engaged by the first support means.

According to another aspect of the present invention, transplanting equipment for use in the transplanting of a potted plant into a container of a larger size comprises repotting means for bringing the root portion of the plant within the confines of the larger container and for introducing a mixture of particulate materials into the gap between the root portion and the larger container until the gap has been filled by said material and by any other materials already so introduced on the root portion of the plant.

Other aspects of the invention will become clear from the description of the various specific embodiments, it being understood that unless the context otherwise demands, each feature so highlighted is to be considered as inventive in its own right and should not therefore be interpreted as having application only in the particular context in Which it is presented in the specification.

Embodiments of the invention will now be described, by way of example only, with reference to the accompanying somewhat diagrammatic and often simplified drawings, in which:

FIG. 5 is a smaller-scale side view of the same transplanter devices at different stages of their operation;

FIG. 6 is an end view of the FIG. 5 assembly;

FIG. 11 is a simplified perspective view of a finger-plate assembly for use in the transplanting equipment;

FIG. 12 shows (on a larger scale) a detail of FIG. 11;

Figure 14:
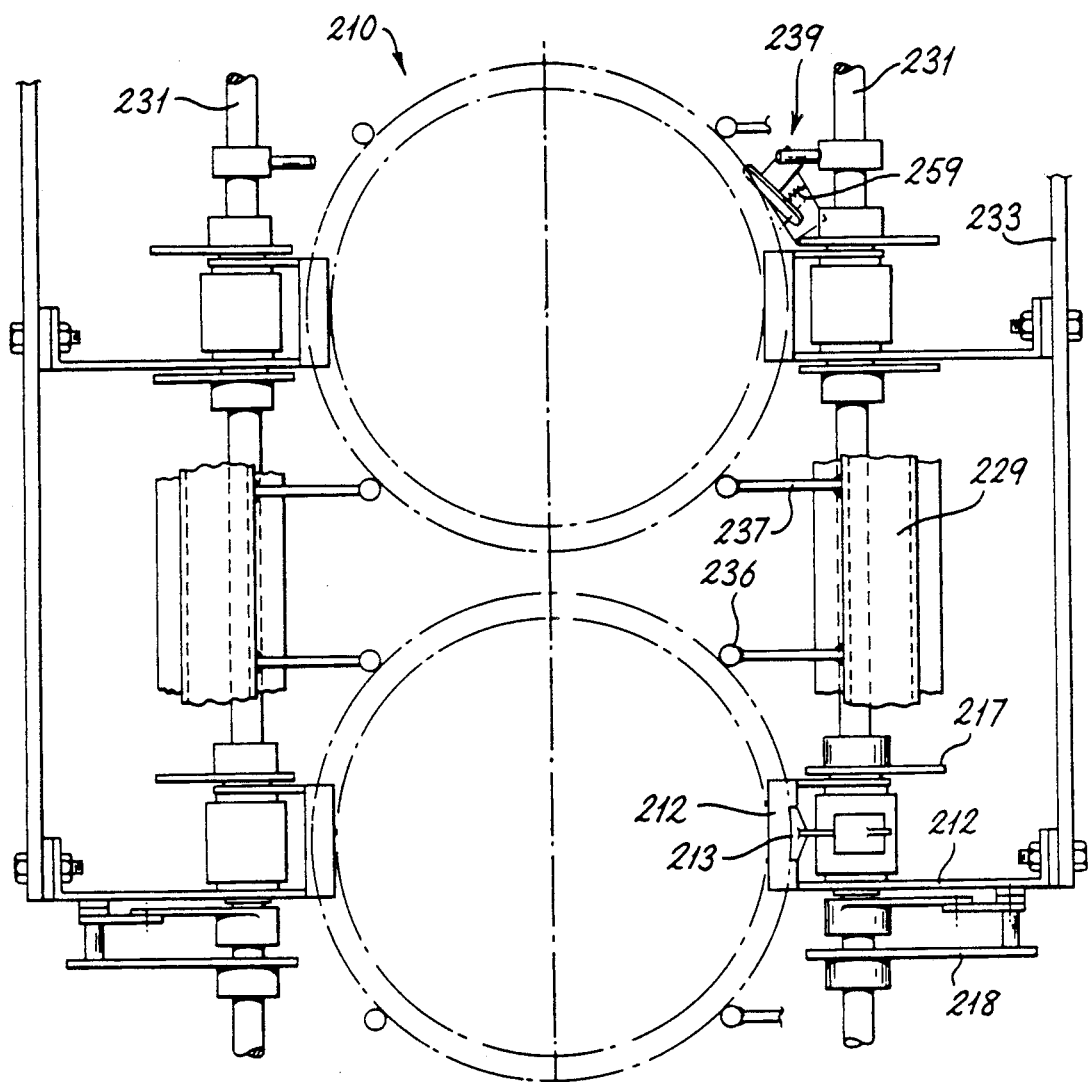
Figure 15:
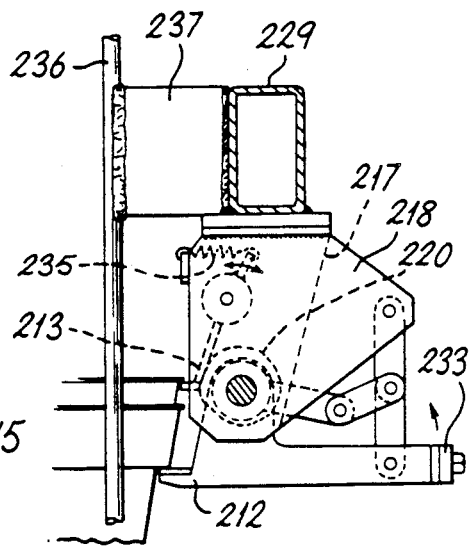
Figure 16:
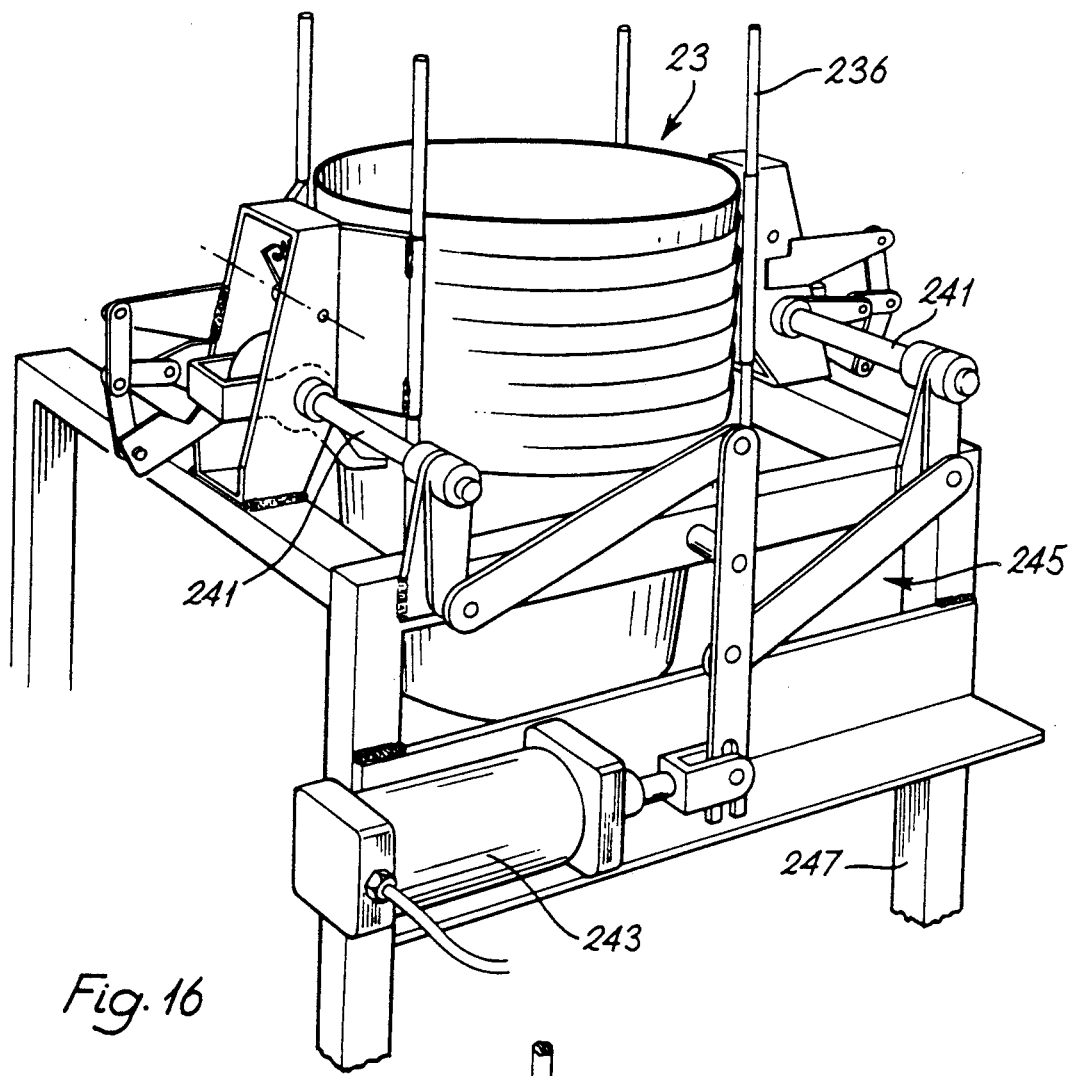
Figure 17:
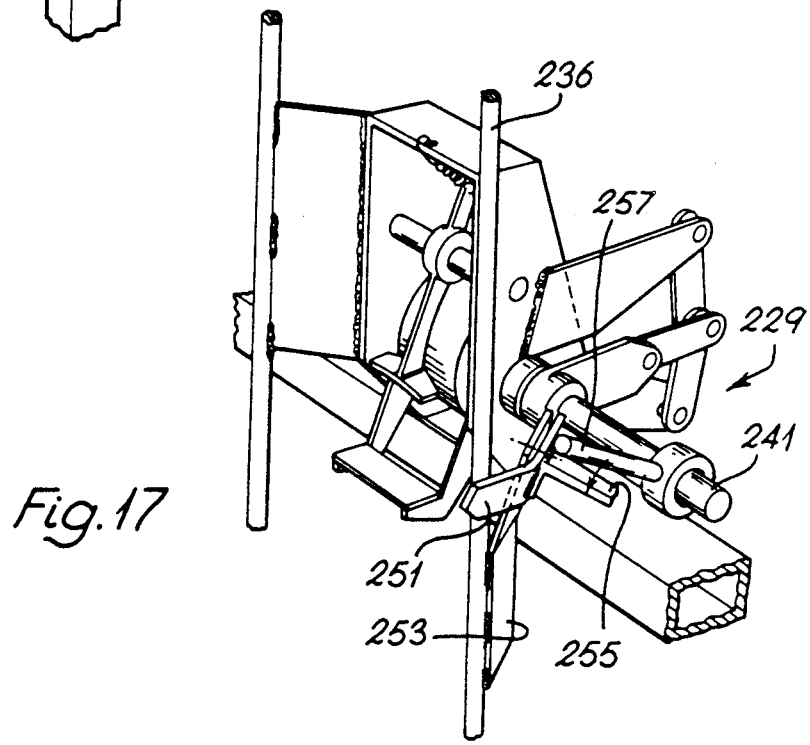
Figure 20:
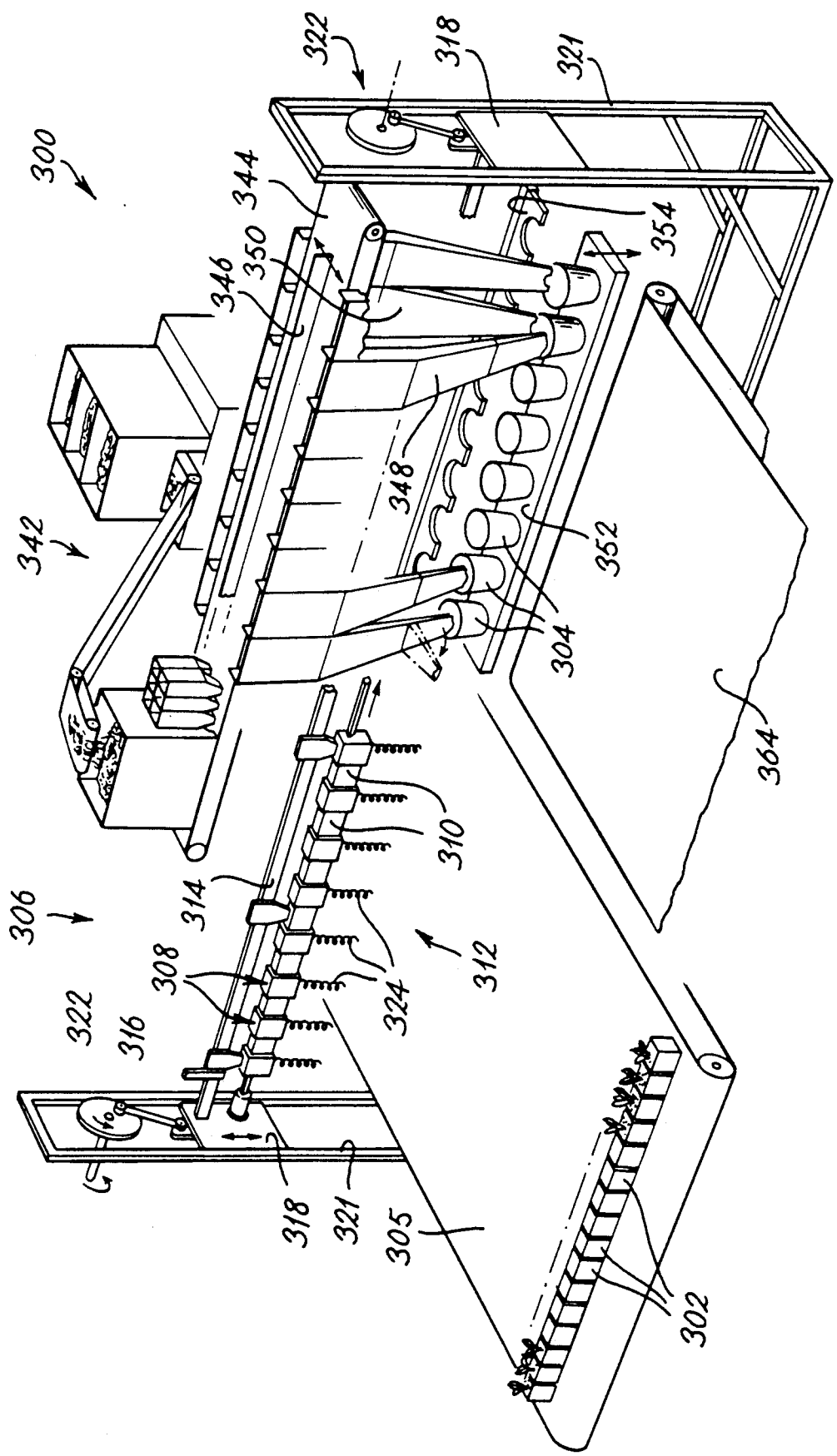
Figure 22:
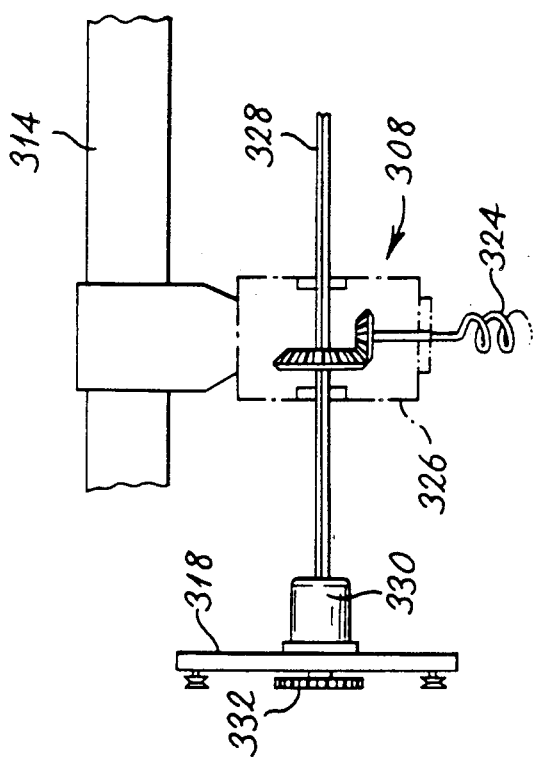
Figure 21:
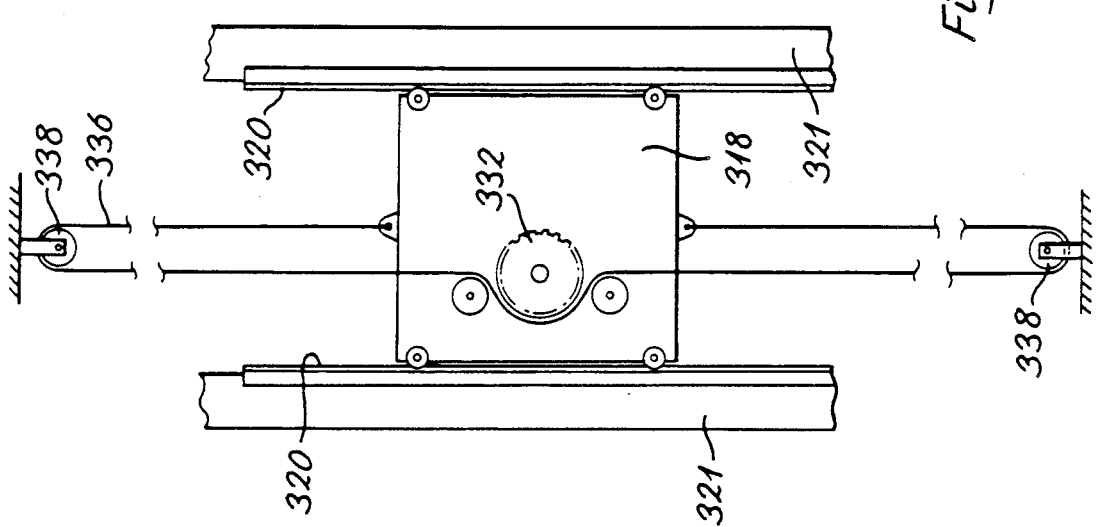

FIG. 13 schematically illustrates the operational path of the finger-plate;

FIG. 14 is a scrap plan view of one design of pot dispenser for use in the equipment;

FIG. 15 shows part of the FIG. 14 embodiment seen from the side;

FIG. 16 is a perspective view of another design of pot dispenser;

FIG. 17 is a perspective view illustrating a pot release mechanism for use in the pot dispensers of FIGS. 14 to 16;

FIG. 18 shows one of the pot dispensers at different stages of its operation;

FIG. 19 shows a control sequence for the different parts of the transplanting equipment;

FIG. 20 is a simplified perspective view of transplanting equipment according to a second embodiment of the present invention;

FIGS. 21 and 22 show side and front views of a drive system for the plant extraction and carrying devices used in the equipment of FIG. 20;

FIG. 23 shows on a larger scale a side view of the pot-loading system used; and

Figure 24:
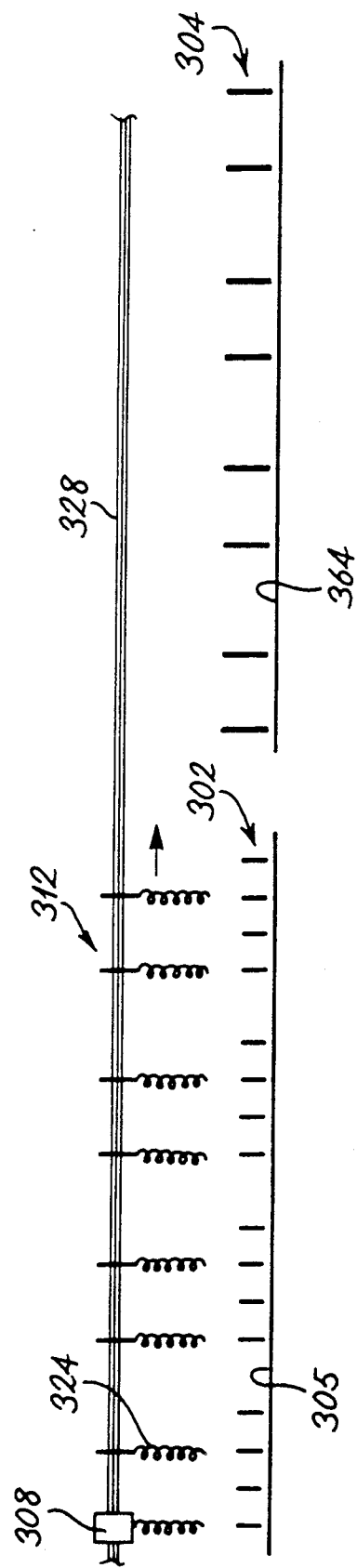

FIG. 24 is a schematic representation of part of an alternative arrangement in which the plant pots are non-uniformly spaced.

Figure 1:
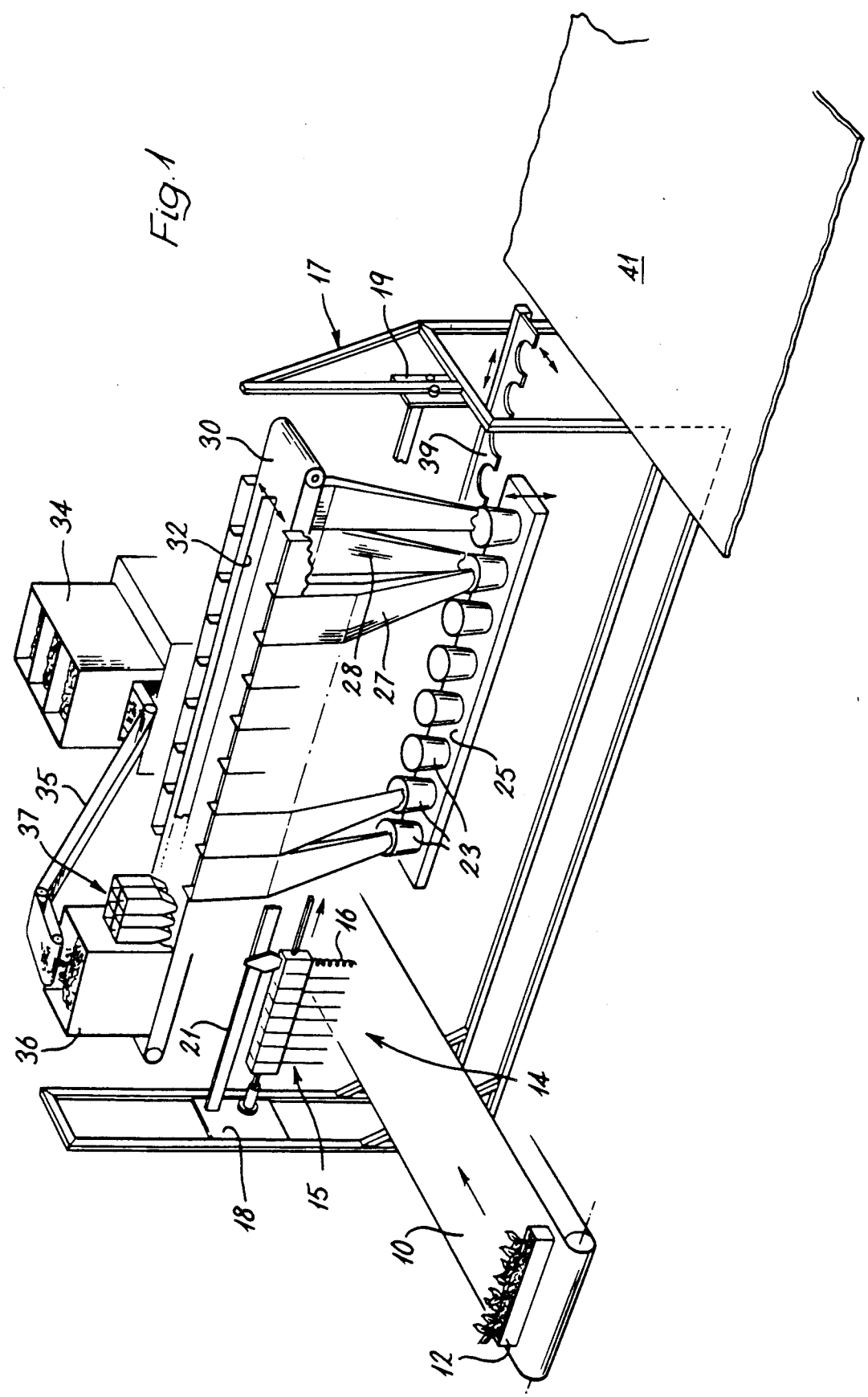
FIG. 1 is a simplified perspective view of transplanting equipment according to a first embodiment of the present invention.

Turning first to FIG. 1 of the drawings, this shows in simplified form the more important elements of one particular design of transplanting apparatus in accordance with the present invention.

Thus reference numeral 10 indicates a conveyor belt arranged to carry row after row of plant-containing pots 12 towards a plant transfer assembly 14.

Assembly 14 comprises an array of pick-up or transfer devices 15 each fundamentally as described and claimed in co-pending UKPA 2186776B (National Research Development Corporation). With these devices bunched up together as shown. the spacing apart and location of the plant-embracing helical probes 16 corresponds to that of the plants in any particular row on conveyor belt 10.

The assembly 14 is supported within the main framework 17 of the apparatus by end support plates 18, 19. Vertical movement of these two support plates allows the probes 16 first to engage the rootballs of the plants and then to remove the plants from the pots 12. Subsequent horizontal movement of the transfer devices along a cross-beam 21 allows the pick-up devices to separate and relocate themselves over a second row of larger pots 23 suitably spaced apart along a tamping unit 25.

When the plants have been lowered into place by a downward movement of the end support plates 18, 19, pairs of opposed chutes 27, 28 are used to fill the pots 23 with material displaced into the chutes from an overhead cross-belt 30. This is done by a pair of scraper blades 32 which act on material discharged on the belt from a hopper/conveyor assembly 34–37. In an alternative arrangement, not shown item 34 is omitted and pre-mixed bulk ingredients are used instead.

When transplanting has been completed and the pick-up devices 15 removed from the pots 23, a finger-plate 39 operates to move the row of pots 23 from above the tamping unit 25 to a discharge conveyor 41. The finger-plate 39 is then used to pick up a new row of the large pots and to hold them over the tamping unit 25 in readiness for the next transplanting operation. In practice, the finger-plate 39 would partly locate the pots above the tamping unit 25 while the pots were being filled. However, for clarity in FIG. 1 the finger-plate has been shown in one of its other positions in its cycle of movement.

Meanwhile, the pick-up devices 15 are returned to the positions shown in FIG. 1 in readiness for the next row of pots on the belt 10.

Figure 2:
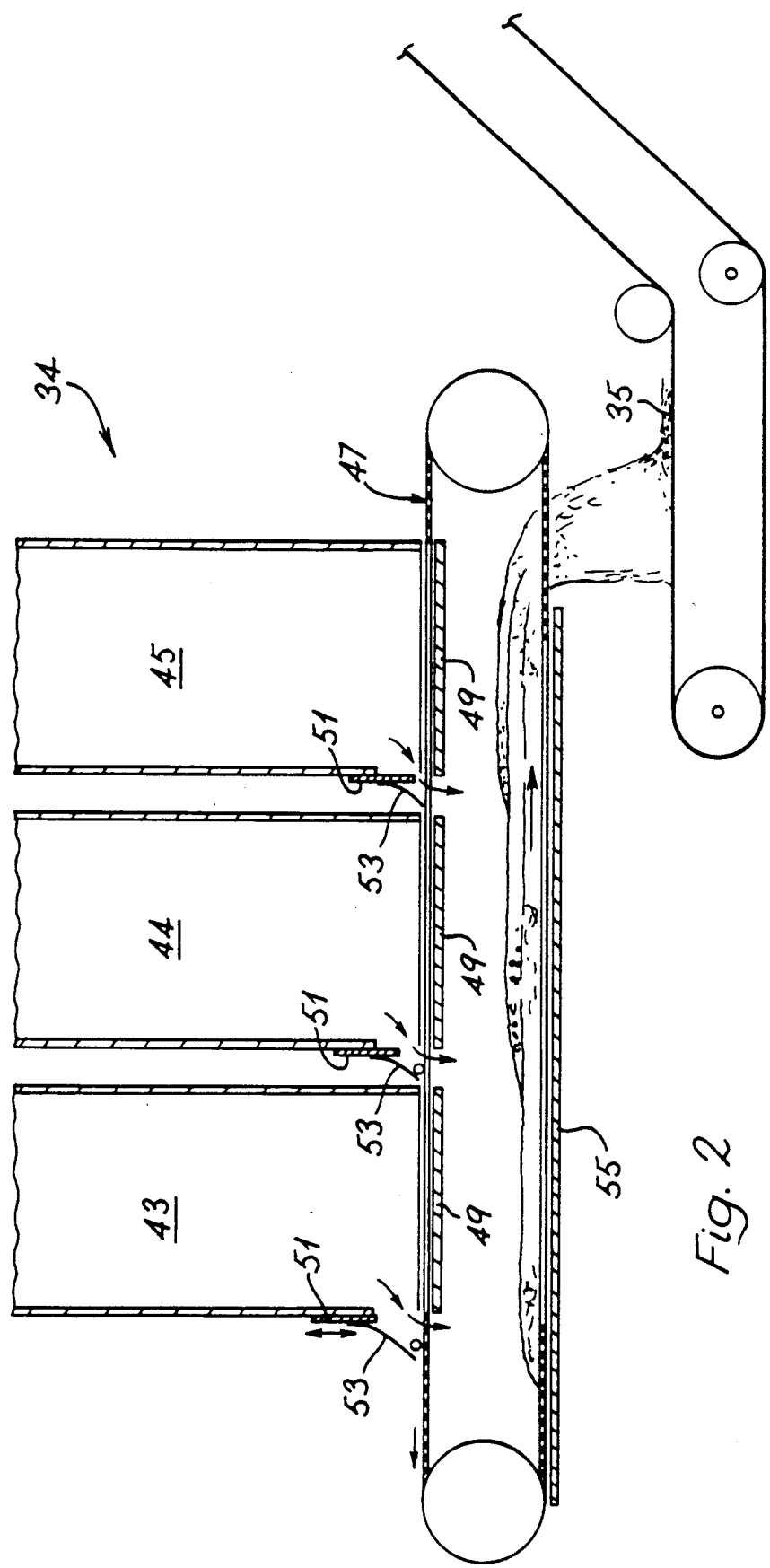
FIG. 2 shows on a larger scale part of the hopper/conveyor arrangement used in the equipment of FIG. 1.

Looking now in more detail at the various constituent parts of the assembly described in outline above. FIG. 2 shows optional item 34 to be made up of three separate hoppers 43, 44, 45 (for peat, bark and grit, respectively), mounted over a rod link conveyor 47.

Located beneath the conveyor under each of the three hoppers is an associated base plate 49 to prevent the premature discharge of hopper material through the top run of the conveyor 47.

At the front edge of each hopper, a vertically adjustable gate 51 determines the amount of material to be drawn from the hopper by the upper run of the conveyor as it moves from right to left over the base plates 49.

Static wipers 53, and optionally the transverse bars beneath them (not referenced), ensure that once clear of the base plates 49, any material drawn from the hoppers in this way will fall through the open mesh of the top and bottom runs of the conveyor 47 to accumulate on a collector plate 55.

From thence it is swept away by the return run of the conveyor 47 for discharge over the right hand end of plate 55 on to the inclined conveyor 35 shown in FIG. 1.

As already described, this latter in turn feeds the mixture into the hopper 36 for discharge on to the cross-belt 30 but it is also to be noted that at this stage different trace elements or other ingredients can be added to the mixture from an appropriate number of auxiliary hoppers 37 (six, in the illustrated embodiment).

Figure 3:
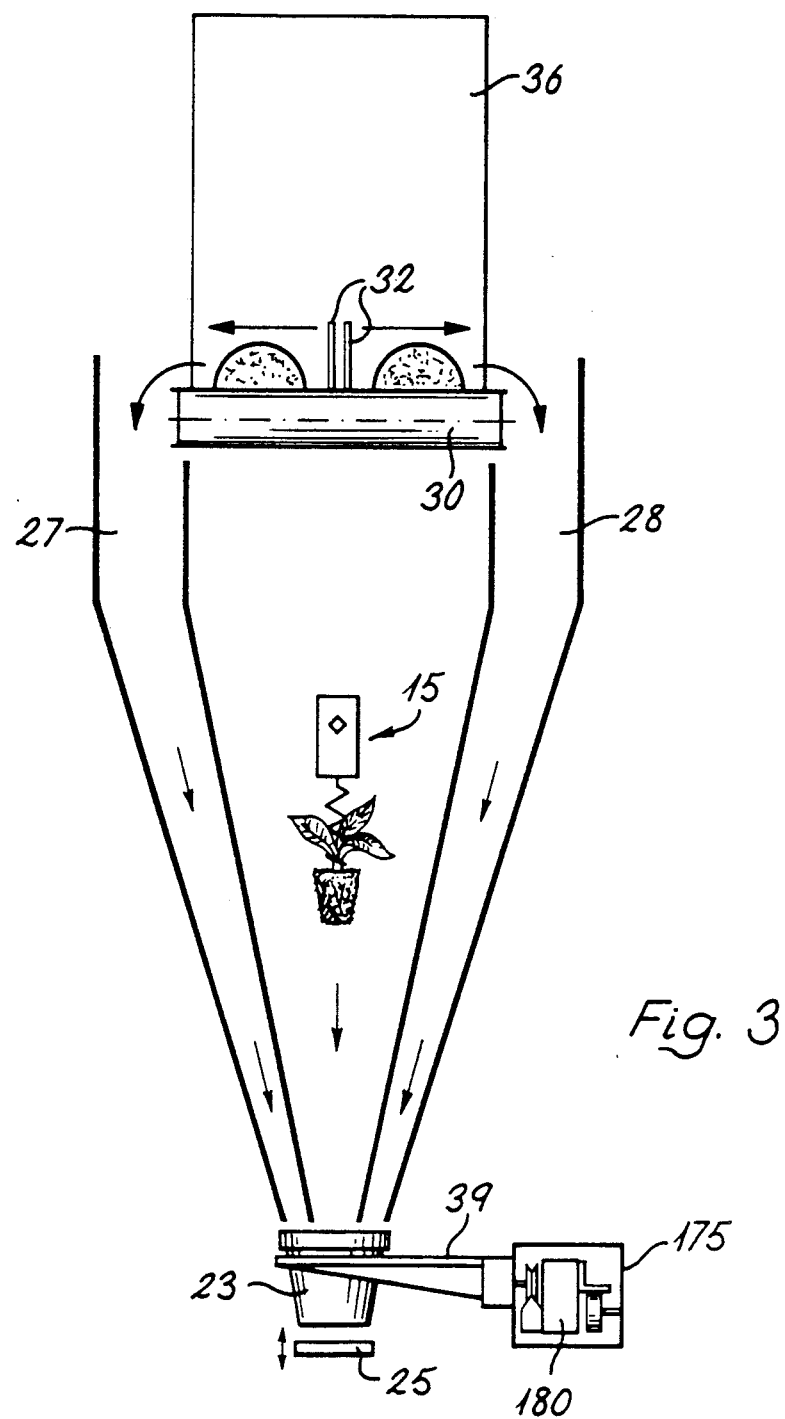
FIG. 3 shows on an even larger scale, details of a pot-loading loading system for the apparatus.

When the material on cross-belt 30 has stopped after reaching the last pair of chutes 27, 28, the scraper blades 32 are driven apart by a suitable mechanism (not shown). This displaces the material down the chutes 27, 28 and into the large pots 23 which it enters on either side of the plants held there by pick-up devices 15 (as shown in FIG. 3 of the drawings).

Figure 4:
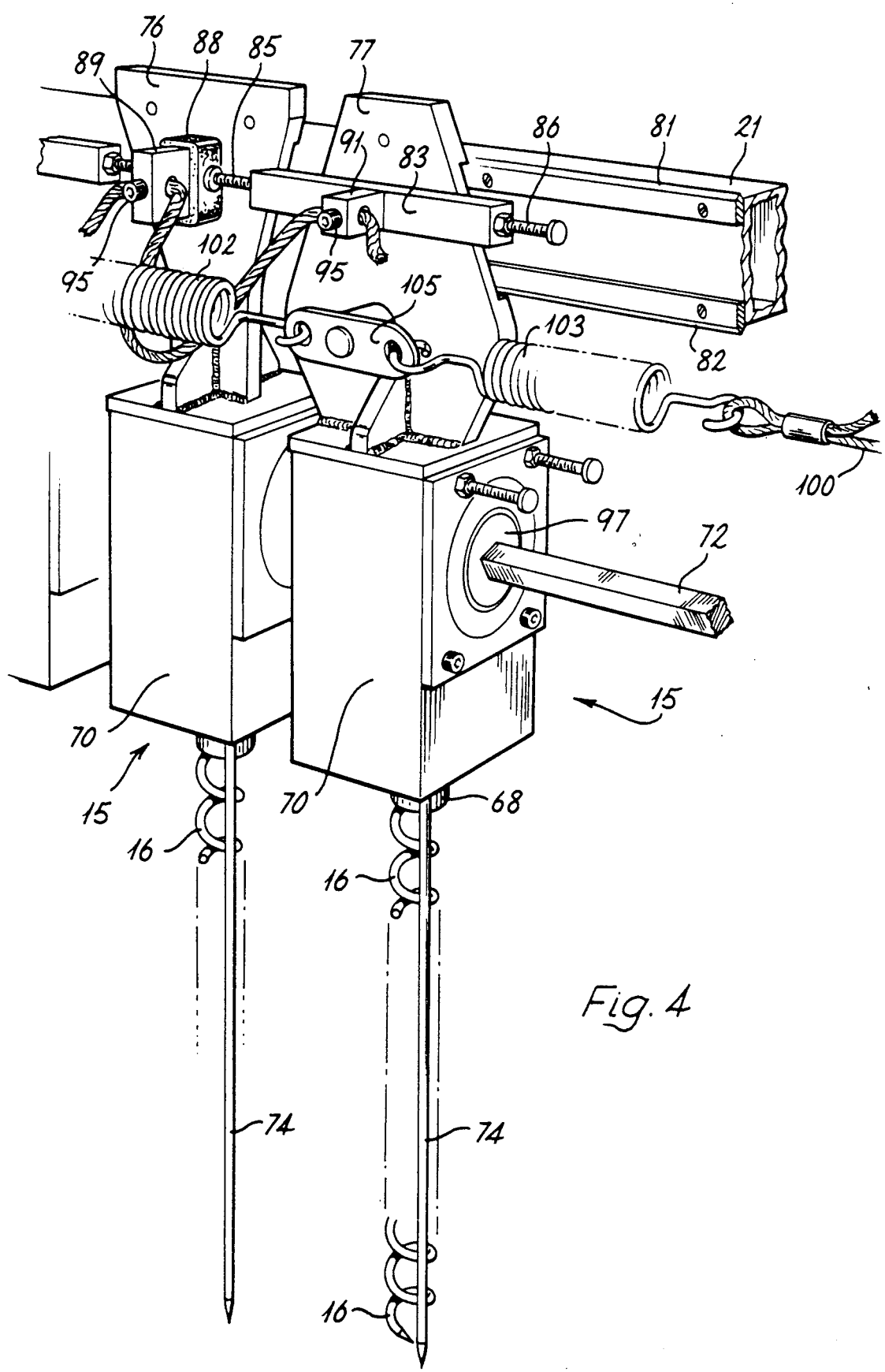
FIG. 4 shows details of some of the pick-up devices used.

More details of the pick-up devices 15 may be had from FIGS. 4 to B where they are illustrated on a larger scale than in FIG. 1.

In these Figures, reference numeral 16 again indicates the helical probes which are conveniently made from steel wire (or other convenient material) so as to be substantially stiff. Unlike a common compression spring, however the lower end of the probe is not formed into a closed loop but remains in the helical shape.

The tip of the probe may be pointed as shown but preferably would have a rounded end so as to reduce the chance of damage to the plant which it is to embrace (FIG. 8) before entering the pot.

At its upper end, an upwardly extending top part of the helically-wound probe is attached to a boss 68 secured to a vertical shaft. This shaft carries a bevel gear which engages with a second bevel gear within the gear box 70. The second gear is driven by the square-section shaft 72 which passes through the gear box 70.

With the pick-up devices bunched together as shown in FIGS. 1 and 4 and on the left-hand side of FIG. 5, each helically-wound probe is positioned so as to have its longitudinal axis approximately over the centre of one of the plant-containing pots on the belt 10. The probes are then rotated about their axes by the drive shaft 72 at the same time as they are fed downwards into the pots.

The drives to the helical probes 16 and the vertical movement of the plates 18 and 19, which carry the beam 21, are both powered by the one motor 152 (FIG. 9) and are arranged so that the longitudinal feed rate of the probes 16 will exactly match the pitch of the helical wires in order that the probes will enter the material in the pots 12 with the minimum of disturbance.

Figure 8:
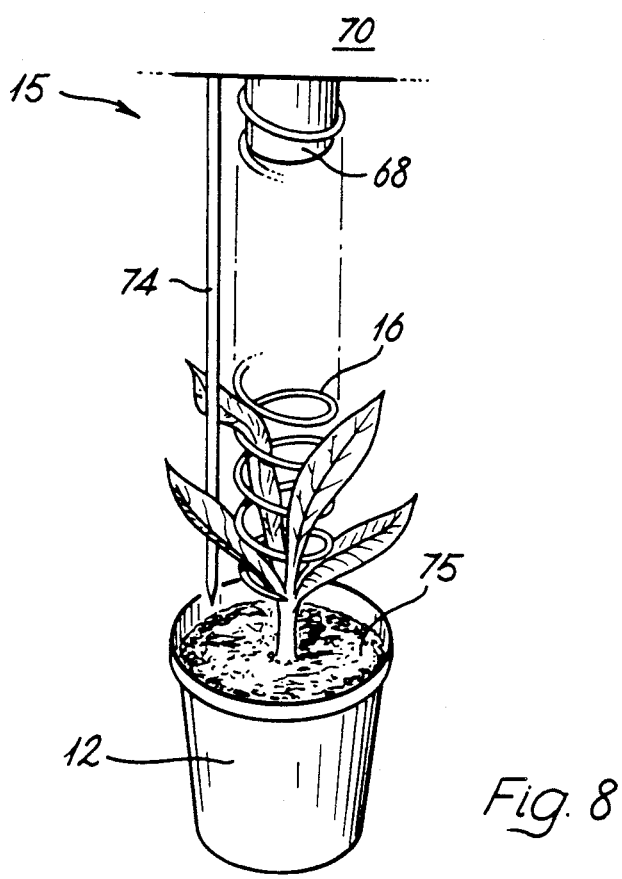
FIG. 8 is a perspective view showing one of the pick-up devices in operation.

To prevent the pots from rotating with the helical probes 16, gear boxes 70 also carry fixed holding probes 74 which are positioned parallel with the axes of the helical probes so as to be lowered into the pots with the helical probes. FIG. 8 best shows this arrangement with the helical probe 16 embracing a plant in one of the pots 12 as the transfer device moves downwardly to engage the probes in the potting compost 75.

A cross bar or finger assembly (not shown) is positioned transversely above the conveyor 10 at a fixed height just clear of the tops of the pots containing the plants which are to be repotted. When the helical probes 16 have been engaged with the plants' roots and compost and the pick-up devices 15 are raised, the pots tend to be lifted as well, but the position of the cross bar or finger assembly is such that it engages with the tops of the rims of the pots so that these are separated from their contents and drop back on to the conveyor 10.

Figure 7:
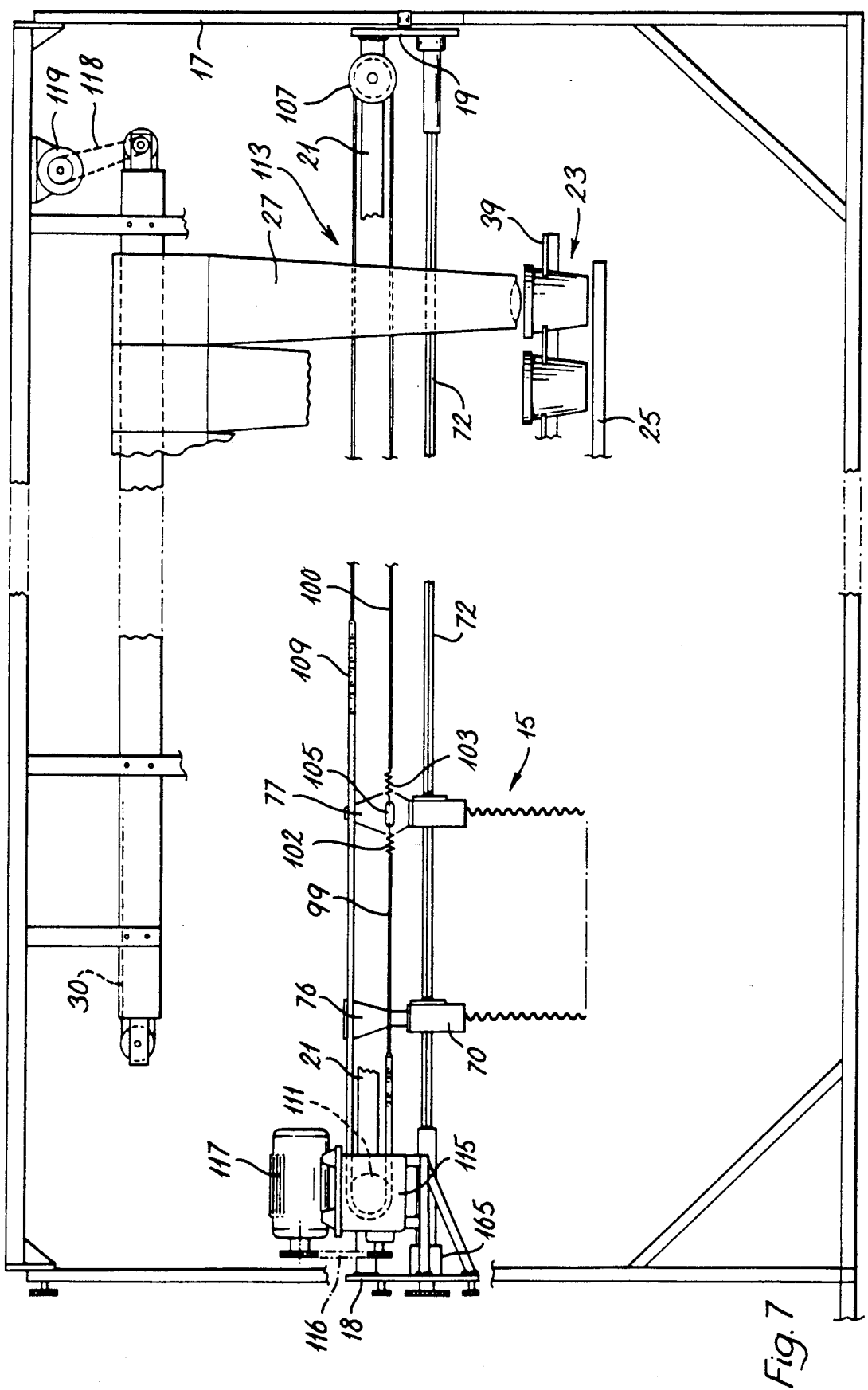
FIG. 7 is a simplified side view of the transplanting equipment showing the principal horizontal drives for the transplanter devices.
Figure 9:
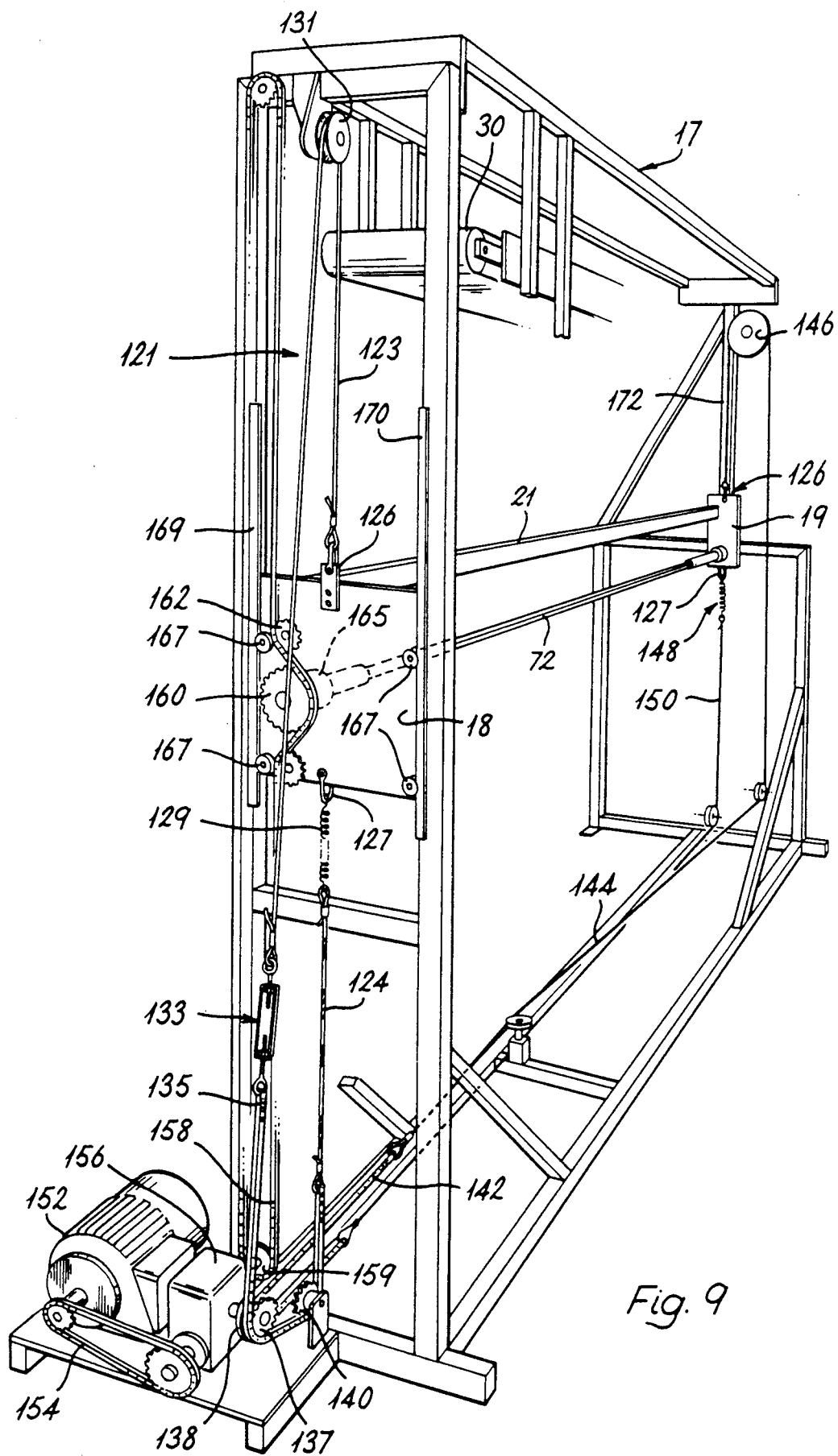
FIG. 9 is a simplified perspective view of the transplanting equipment showing the principal vertical drives for the pick-up devices.

The plant may be released from the pick-up device 15 by rotating the helical probe 16 in the reverse direction while raising the beam 21 which carries the gear boxes 70. The beam 21 may be raised or lowered without rotation of the helical probes, as is required in parts of the cycle, by disengaging the electro-magnetic clutch 165 (FIGS. 7 and 9).

The probes 74 prevent the plant or pot from rotating as the helical probes 16 are screwed into or out of engagement.

The ratio of the pitch of the helical probe helix to its internal diameter is best between 1:4 and 3:1 depending on the characteristics of the leaf, stem and roots of the plant and the size of the container.

Alternative designs of transfer device are described in the co-pending application 2186776B already referred to above.

FIG. 4 also clearly shows the support lugs 76, 77 by which the transfer units are supported on the main beam 21.

These lugs are alternatively upwardly tapering (lugs 76) and downwardly tapering (lugs 77) and each carries three wheels 79 (FIGS. 5 and 6) running along two knife-edge guide rails 81, 82 secured to main beam 21.

Having the direction of taper of the lugs alternating, allows the greatest possible spread of the wheels 79 consistent with the close packing of the transfer units. Increasing the stability of the transplanting system in this way also increases the operational accuracy of the apparatus.

The downwardly tapering lugs 77 carry support blocks 83 for adjustable travel stops 85, 86. In the close-packed position shown in FIG. 4, these stops engage with shock-absorbing rubber sleeves 88 which are carried by other support blocks 89 secured to the upwardly tapering lugs 76.

Blocks 83 additionally carry a cord attachment block 91 and the maximum separation of the transfer devices (shown, for example, on the right hand side of FIG. 5) is determined by a spacer cord 91 passing through appropriate apertures in these blocks and in the blocks 89 referred to earlier. The cord is secured in place in the various blocks by steel screws 95.

Reference numeral 97 indicates a bearing which supports a hollow shaft which carries a bevel gear. The square hole through this shaft enables it to slide easily along the axially-fixed drive shaft when required to do so.

As best shown in FIG. 7, the drive system for moving the transfer devices between the two extremes of travel depicted in FIG. 5, includes two lengths of nylon cord 99.100 joined via tension springs 102, 103 with opposite ends of a connection lug 105. This latter is secured to the pick-up device 15 on the extreme right hand side of the assembly. The right hand cord 100 then passes round an end pulley 107 for connection with a length of chain 109. Chain 109 in turn passes around a drive sprocket 111 for connection with the free end of the second cord length 99. Tension springs 102.103 function to keep taut the drive loop 113 comprised by items 99, 100, 109.

In an alternative tensioning arrangement (not shown), springs 102, 103 are omitted and the lug 105 is replaced by a turnbuckle.

The sprocket wheel 111 is driven from a right-angled gearbox 115 powered via a chain and sprocket connection 116 from a frame-mounted motor 117.

FIG. 7 also illustrates how the cross-belt 30 is driven via a chain drive 118 from a frame-mounted motor 119.

Vertical movement of the transfer devices is required during the actual steps of depotting i.e. removing the plants from their pots, and repotting. This is achieved by the pulley/chain drive system 121 best seen from FIG. 9 where the transfer devices have been omitted for clarity.

Basically, drive system 121 comprises a length of steel cable 123 and a length of nylon cord 124 which are joined with the top and bottom of the end support plate 1B by means of connectors 126, 127 and a tension spring 129.

The upper one of the two cord lengths passes over a support pulley 131 at the top of the framework 17 to have its free end joined through a turnbuckle 133 with one end of a drive chain 135.

After passing around the first one of twin sprockets 137, 138 the chain 135 passes around an idler 140 for connection with the free end of cord length 124.

The second twin sprocket (138) engages a second length of chain 142 which is connected with a second length of steel cable 144. This latter passes around various guide pulleys and top pulley 146 for connection with the upper end of the end support plate 19.

The bottom of the end support 19 is connected via a tension spring 148 to a third length of nylon cord 150 which also passes around various guide pulleys for connection with the other end of drive chain 142. As before, reference numerals 126, 127 indicate connectors.

A reversible motor 152 is operable via a chain and sprocket connection 154 to drive a right-angled gear box 156 which in turn drives the common support shaft for the two sprockets 137, 138 so as to raise and lower the end support plates 18, 19, and the assembly support beam 21 secured thereto.

The gear box 156 also has a second output shaft which is connected via a chain and sprocket link 158, 159 with a sprocket drive wheel 160 mounted on one end of the square section shaft drive 72.

Reference numerals 162, 163 indicate two idler wheels designed to ensure that there is an adequate wrap of the chain 158 about the drive wheel 160. This latter can be connected or disconnected with the shaft 72 by means of an electro-magnetic clutch 165.

For ease of travel, the end support plate 18 is fitted with four support wheels 167 running on vertical knife edge rails 169.170 secured to framework 17 as shown. The corresponding arrangement for plate 19 (rollers on either side of the vertical frame member 172) is clearly seen from FIG. 1.

During the plant transfer and pot filling steps, the fingerplate 39 accurately aligns the pots 23 with the tamping unit 25 as shown, for example, in FIG. 3, the crank-driven vertical vibrations of tamping unit 25 during loading ensuring that the plants are securely bedded into place.

Figure 10:
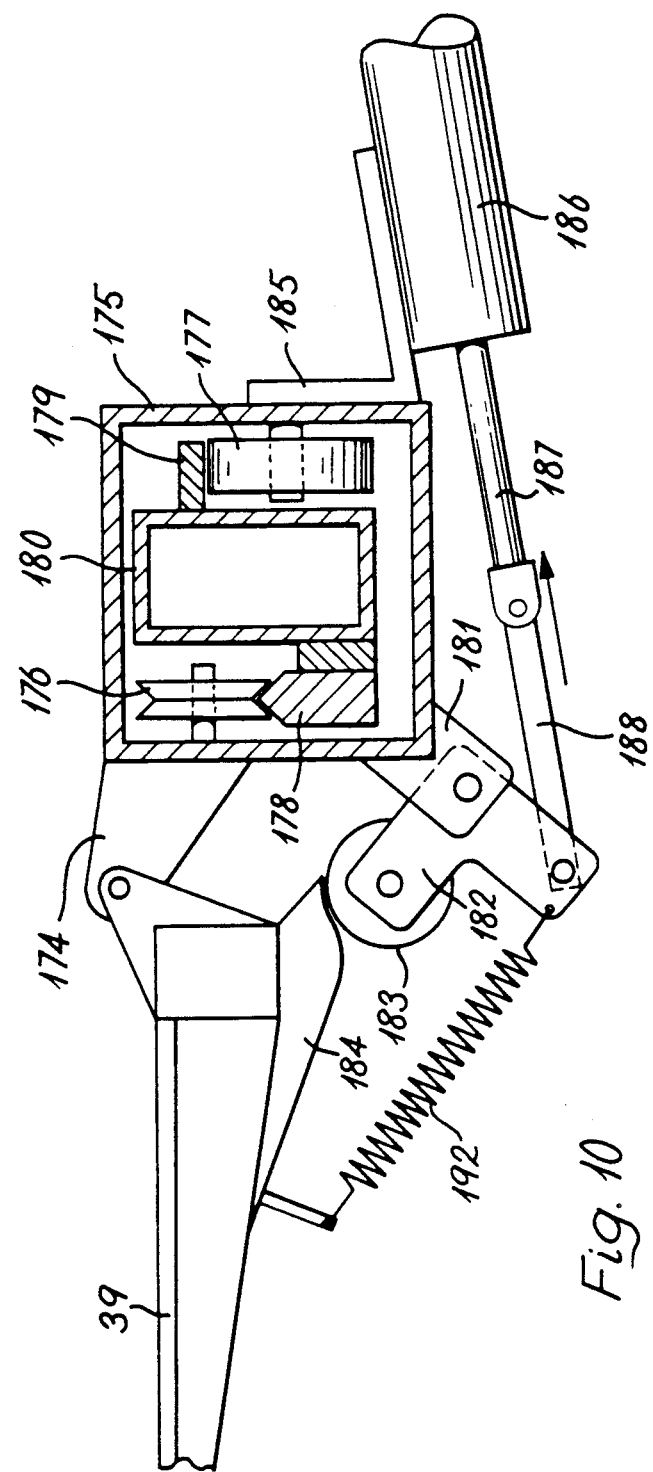
FIG. 10 shows, on a larger scale, part of the pot-handling system already depicted in FIG. 3.

As best seen from FIG. 3 and the larger scale view of FIG. 10, the finger-plate 39 is pivotally attached to a first bracket 174 extending to one side of a square carriage 175. This latter is provided with two pairs of internal support wheels 176, 177 respectively running along the top of a knife-edge guide rail 178 and the bottom of a flat longitudinal guide plate 179 to stop the carriage tipping.

Both guide rail 178 and guide plate 179 are rigidly secured to a rectangular beam 180 running part of the length of the framework 17 and beyond (FIG. 11).

A second bracket 181 attached to the bottom edge of the carriage below bracket 174 pivotally supports a bell-crank lever 182. The upper end of lever 182 carries a roller 183 which engages with a downwardly projecting part 184 of the finger-plate to support it in the pot-locating position shown in FIG. 10.

At the opposite corner of the carriage 175, a third bracket 185 supports a solenoid 186, the plunger 187 of which is pivotally attached to one end of a link 188. The other end of link 188 is pivotally attached to the lower end of the bell-crank lever 182 as shown.

At its two ends, the beam 180 is supported on end plates 189, 190 running along the cross-beams of the main framework 17 and an extension framework 191.

Reference numeral 192 in FIG. 10, indicates a tension spring acting between the finger-plate 39 and the bell-crank lever 182 as shown.

Motion of the finger-plate 39 from end to end of the beam 180 is effected by a chain and sprocket drive from a motor/gearbox drive assembly 193 mounted on one end of the beam 180.

Motion of the finger-plate at right angles to this direction is effected by a corresponding motion of the end plates 189, 190 along the cross-beams of frameworks 17, 191. The scrap view of FIG. 12 shows on a larger scale how the end plate (190) may be provided with two pairs of support wheels running along the top and bottom knife edges of a pair of guide rails (194, 195) mounted on the relevant cross-beam.

This second motion of the finger-plate is produced by a pair of interconnected crank arms (not shown), joined by connecting links to opposite ends of the beam 180. The cranks are powered by an electric motor and reduction gear box.

FIG. 13 illustrates the complete operational cycle of the finger-plate 39 which in the position shown in FIG. 13 has already begun its return motion back over the discharge conveyor 41 after tilting to deposit on the conveyor a row of plant-bearing pots 23 filled with compost etc. from the chutes 27, 28.

The end plates 189, 190 of the support assembly for plate 39 continue to drive the tilted finger-plate against the motion of conveyor 41. As the finger-plate approaches position 197, it is relatched on contact with a striker plate assembly (not shown). On reaching its new position, the finger-plate is moved back along the beam 180 by drive assembly 193 to a third position 199 at which it picks up a row of empty pots 23 from a suitable pot dispenser.

The end support plates 189, 190 are next driven back along the cross-beams of frameworks 17, 191 to move the finger-plate 39 to its last position 201 in which the pots are located over the tamping unit 25 in readiness for the next filling and transplant operation.

When this next transplanting has been completed, the fingerplate is moved back along beam 180 to the full line position in FIG. 10 whereupon the solenoid plunger 187 is retracted to tilt the finger-plate and deposit the new row of plant-bearing pots 23 on the conveyor 41.

A similar finger-plate arrangement to that above described for pots 23 can be used if desired, to load the pots 12 on to the belt 10, although obviously some redimensioning will be required.

Two forms of the pot dispenser referred to above are shown in FIGS. 14 and 15 and in FIGS. 16 and 17. They can probably best be understood by looking first at FIGS. 18 a,b,c,d (collectively referred to as FIG. 1B) which illustrate in simplified diagrammatic form the pot dispenser of the preferred first embodiment at various stages of its operation.

Included in the pot dispenser unit 210 of FIG. 18 (and FIGS. 14 to 17) are top and bottom pot support members 212, 213 which are respectively adapted to engage under the upper lip (member 212) and the top edge beading (member 213) of the bottom pots 215, 216 in the stack of pots 23.

Support member 213 is mounted for limited rotary motion about a pivot secured to two side plates (217, 218) of the unit while support member 212 hangs freely on the drive shaft of a cam 220 bearing against the back surface of the support member 213 which is spring-loaded in the opposite direction.

The rear end of the support member 212 is also supported from the side plate (218) by two pivoted links 222, 223. A third pivoted link 225 interconnects the common pivot of links 222, 223 with an arm 227 secured to the drive shaft for cam 220.

Figure 18B:
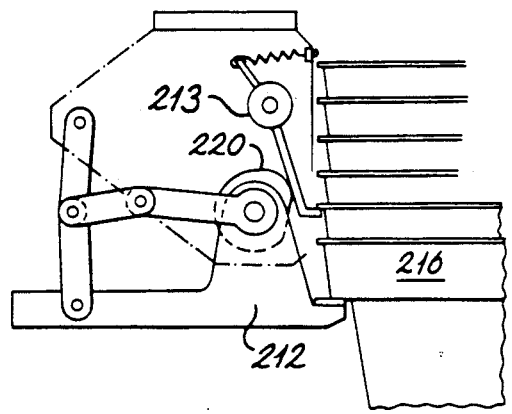
Figure 18A:
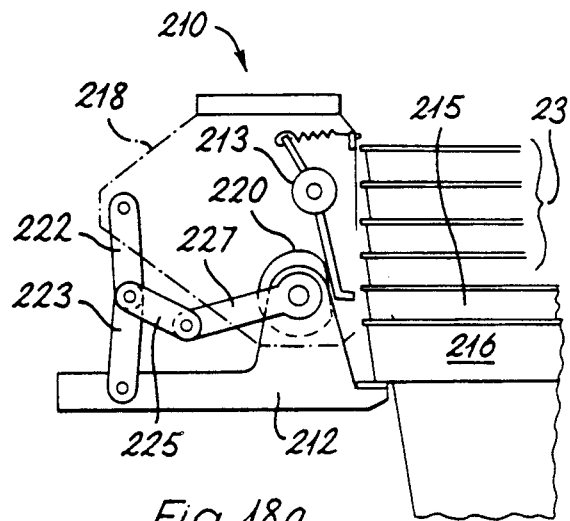

As will be seen from FIG. 18, the relative shapes and dimensions of the different parts of the pot dispenser unit are such that in FIG. 18a. the stack of pots is supported by the first support member 212 which sits under the lip of the lowermost pot 216. In this situation, the second support member 213 is withdrawn to lie clear of the penultimate pot 215.

Figure 18C:
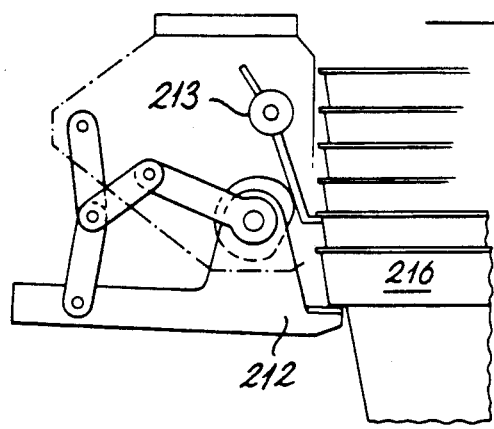

As the cam 220 turns (clockwise), it brings the second support member 213 into contact with the penultimate pot 215 which it engages just under the beading running round the top edge of the pot (FIG. 18b). The grip exerted by the second support member is increased as the cam continues its clockwise movement and the arm 227 begins to collapse the linkage 222, 223 to draw the bottom support member 212 away from the bottom pot 216 (FIG. 18c).

Figure 18D:
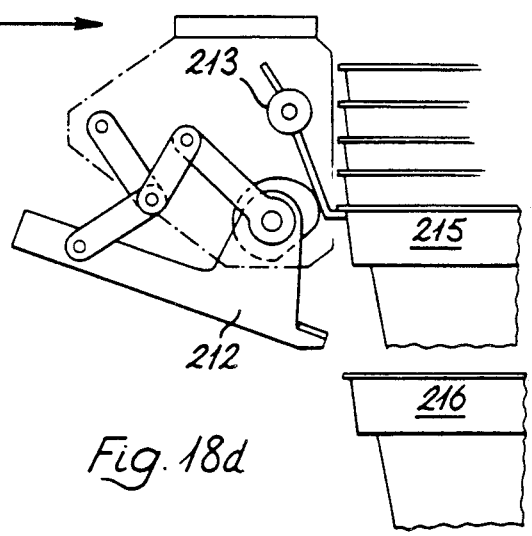

By the time the cam has reached the position shown in FIG. 18d, the first member 212 will have withdrawn from all contact with the bottom pot 216 which falls away while the rest of the stack is supported by the support member 213. At this point, the direction of cam movement will reverse until the first support member has been returned to the pot-supporting position shown in FIG. 18b.

Further rotation of the cam in the anti-clockwise direction will allow the biasing spring on the second support member 213 to withdraw that member from engagement with the pot 215 with the result that the stack of pots will fall back to the position illustrated in FIG. 1Ba but with the pot 215 now at the bottom of the stack in place of pot 216. The unit 210 is now ready to dispose of the next pot (215) when called upon to do so.

Although FIG. 18 only shows one such pot dispenser unit, it will be appreciated that in practice there will be sixteen such units. These are arranged in pairs (one pair for each of the eight stacks) behind the tamping unit 25 and above the return path of the finger-plate 39. The pot dispenser units are adapted to operate in synchronism.

FIGS. 14 and 15, which use the same reference numerals as FIG. 18 wherever appropriate, show, by way of example, two pairs of opposed pot dispenser units 210 to illustrate how these are driven in unison.

In each case, the units 210 are supported from a common cross-beam 229 of framework 17 and have their cams driven by a common drive shaft 231. The extended side plates 218 of the assemblies are linked by a common backing member 233. A linkage connection (not shown) is provided between the two drive shafts 231 on either side of the assembly to ensure their simultaneous operation.

FIG. 15 also shows how, in each case, the second support member 213 is biased into contact with the rotating cam 220 by a tension spring 235 acting between the top of the support member and the front of the side plate 218.

Four guide rods 236 for the stack of pots are each secured to the beam 229 by an appropriate bracket member 237.

The pot dispenser units 210 are each completed by a knock-off device 239 (of which only one is shown in FIG. 14) to make absolutely sure that the bottom pot leaves the stack when released by the support member 212 (FIG. 18d).

FIGS. 16 and 17 show an alternative pot dispensing assembly in which the common drive shafts 231 of the previously described embodiment have been replaced by individual drive shafts 241.

These are driven by a pneumatic ram 243 through a linkage 245 to ensure simultaneous operation of the two pot dispenser units on each side of the stack of pots. A similar linkage (but with the pneumatic ram absent) can be used at each end of the pot dispensing assembly of FIGS. 14 and 15 to link the motion of the two drive shafts 231.

The remaining parts of the pot dispenser units of FIGS. 16 and 17 are functionally very similar to those of the earlier embodiment and for convenience have been identified by the same reference numerals. It will be noted, however, that the assembly of FIGS. 16 and 17 is bottom-supported (on frame 247) whereas that of the earlier embodiment is top-supported (from cross-beam 229.)

FIG. 17 shows a knock-off device for making absolutely sure that the bottom pot will fall away from the stack when released by the support member 212. This is more positive than just relying on gravity and minimal adhesion between the different pots. As the knock-off device can be identical or substantially identical to that used in the embodiment of FIGS. 14 and 15, the same reference numeral (229) has once again been used to identify it.

Thus referring now to FIG. 17, the knock-off device 239 comprises a release bar 251 bent inwards so as (in its inoperative position) to lie just above and to one side of the top edge of the lowermost pot in the stack.

At its innermost end, the release bar 251 is pivotally attached to an angled support bracket 253. This is secured to one of the pot guides 236 in the embodiment of FIGS. 16 and 17 and to the rear side plate 217 in the embodiment of FIGS. 14 and 15. The pivot axis is indicated by a dot-dash line in FIG. 17.

An L-shaped plate 255 is welded to the release bar 251 between its free end and its pivot position.

The drive shaft 241 for the cam 220 also carries a striker bar 257. Rotation of the cam drive shaft to release the lowermost pot 216 (FIG. 18d) will also rotate the striker bar from its FIG. 22 position to engage the top of the L-shaped plate 255. This in turn will force down the free end of the release bar 215 until it engages the top edge of the lowermost pot to free it from the remainder of the stack if, for any reason, it has not already fallen away under gravity.

A spring identified by reference numeral 259 in FIG. 14 but omitted (for clarity) from FIG. 17, will in both cases return the knock-off bar 251 to its original position as the striker bar 257 is withdrawn by the counter rotation of the drive shaft 241 towards the FIG. 17 position.

It will be appreciated that it is essential in the assemblies so far described that all the different operations should be properly synchronized and a control sequence for doing this is illustrated in schematic form in FIG. 19 of the drawings. This Figure is self-explanatory and will not further be elaborated on here.

Turning now to FIG. 20 of the drawings, this shows alternative equipment 300 for transferring plants from their original growing pots 302 to a row of larger second pots 304.

It will be observed that the centre-to-centre spacing of the eight second pots 304 is double that of the sixteen first pots 302 and this difference in pot numbers and spacing is essential to the successful operation of the illustrated apparatus in which alternate rows of large pots 304 are filled with the plants from the odd-numbered group of pots 302, and the intervening rows of large pots 304 are filled with the plants from the even-numbered group of pots 302.

Conveniently, the pots 302 are loaded on to the supporting conveyor belt 305 by hand at the required spacing or this may be done mechanically using an appropriate mechanism (not shown).

In an alternative embodiment (not shown), the conveyor belt 305 carries compartmental pot-locating grids to ensure the accurate positioning of the pots 302. Alternatively, item 305 may consist of a belt or chain conveyor with suitable pot-locating apertures or attachments.

Basically, the transfer assembly 306 for moving the plants from one set of pots to the other comprises a row of eight pick-up devices 30B interconnected by spacers 310 to form a single transfer unit 312. This unit is slidingly suspended from a beam 314 extending transversely across the full width of the apparatus.

A fixed stop (not shown) limits the movement of unit 312 towards the end plate 318 when it is to align with the odd-numbered pots, and a retractable stop 316 e.g. a solenoid-operated bolt, is operated to limit the travel when the unit 312 is to align with the even-numbered pots.

The transverse movement of the transfer unit 312 along the support beam 314 is conveniently effected by an externally powered chain drive of the sort disclosed in the preceding application. This facilitates a smooth motion of the beam 314 which is especially desirable for transplanting delicate poorly rooted plants.

At its ends, the transfer unit support beam 314 is secured to support plates 318. These are mounted for vertical movement along knife edges 320 of a framework 321 (FIG. 21) and they are driven in this motion by crank drives 322.

Each of the pick-up devices 308 is essentially as described in the preceding application. Thus each such device comprises a helically-disposed plant-embracing probe 324 driven through a gear box 326 (FIG. 22) from a common square or other suitable section drive shaft 328 also mounted on the end support plates 318. In an alternative embodiment (not shown), only one of the probes 324 is driven in this way and the others are driven from it by a chain or chains engaging sprockets mounted concentrically on each probe or by a suitable train of spur gears.

At one extremity, the drive shaft 328 is connectable through an electromagnetic clutch 330 to an external drive sprocket 332. This latter engages a chain 336 passing around positionally-fixed end sprockets 33B for attachment to the top and bottom of the associated support plate 318 as shown (FIG. 21).

Thus a vertical movement of the plates 318 to raise or lower the pick-up devices 308 will cause the drive sprocket 332 to rotate as it runs along the chain 336 in one (e.g. upwards) direction and the chain 336 moves at exactly the same speed in the opposite (downwards) direction. Engagement of the ClutCh 330 enables this rotation to be transferred to the drive shaft 32B to rotate the probes 324 into or out of engagement with the plants to be repotted.

In an alternative embodiment the end sprockets 338 are omitted and a shortened chain 336 is fixed to the support structure for these sprockets instead of to the tops and bottoms of the plate 318. With this latter arrangement, the drive sprocket 332 will be rotated at only half the speed that it is rotated in the illustrated embodiment for the same up and down motion of the end plates 318. Thus it will be necessary to double the ratio of the driving to driven bevel gear wheel diameters in the gear box 326 if the same rotational speed of the probes 324 is to be achieved.

In a further alternative, the chain and sprocket drive is replaced by a simple rack and pinion assembly.

In operation of the apparatus 300, the sequence of movements of the transfer unit and its probes 324 is as follows: (1) with the retractable stop 316 withdrawn, the unit 312 is moved into abutment with the fixed stop; (2) the clutch 330 is engaged and the unit 312 is lowered with the probes 324 positioned over the odd-numbered pots 302, so that the rotating probes progressively embrace the plants in these pots down to and including their root portions; (3) once this has been achieved, the rotation of probes 324 is stopped by disengaging clutch 330 and the unit 312 is raised to remove the plants from the pots 302, (4) unit 312 is then moved to carry the captured plants over and lower them into the larger pots 304; (5) the pots 304 are filled and tamped; (6) the clutch 330 is re-engaged and the probes 324 are rotated in the opposite sense to step 2 while the unit 312 is moved upwards, thereby to "unscrew" the probes from the newly positioned plants without significantly disturbing the material in the pots 304; (7) the retractable stop 316 is moved into its operating position (this can be done earlier, if desired), (8) the clutch 330 is disengaged and the unit 312 is returned over the pot-bearing conveyor belt 305 into abutment with stop 316 (the nearer of the two stops) to bring the probes over the plants in the even-numbered pots 302; (9) steps 2 to 7 are repeated to move the plants from the even-numbered pots 302 into the next row of pots 304 in the manner above described., and (10) the entire process is repeated from step 1.

It will be understood that the drives to the helical probes and the vertical movement of the plates which carry the beam 314, are both powered by the one motor and are arranged so that the longitudinal feed rate of the probes will exactly match the pitch of the helical probes. This ensures that the probes will enter and leave the material in the pots 302, 304 with the minimum of material disturbance.

Steps may be taken to stop the pots rotating with the probes (as described in the preceding application).

The filling and tamping of the larger pots 304 is carried out in substantially the same way and with substantially the same structure as in the preceding application using a hopper/conveyor delivery system 342, an overhead chute-loading belt 344, an oscillating distribution plate or plates 346, chutes 348, 350 and tamping unit 352. The only significant difference in the repotting-/tamping region of the assembly is that the chutes 348 on one side of the assembly are pivoted to allow a simple sideways withdrawal of the plant-bearing pots 304 at the end of the repotting process (as illustrated in FIG. 23 at 348').

As in the preceding application, a finger plate 354 is used to take a row of eight pots 304 from a number of stacks 356 of such pots each held in a respective dispenser (not shown).

The finger-plate 354 is then displaced sidewardly to bring the pots 304 below the chutes 348, 350 for filling. This done, the pots 304 continue in the same direction with the lower halves 348' of the chutes 34B pivoting as shown in FIG. 23 to make room for the plants.

At the end of what will be its leftwards journey as seen in FIG. 23, the finger plate reaches a ramp-portion 358 of the surface 360 on which it has up till then been supported. This results in the finger plate swinging down about a slot-supported top pivot 362 to deposit the plant-bearing pot 304 on a discharge conveyor 364. This latter moves one pot row spacing forwards before the finger plate is returned along the surface 360 to take up the next batch of pots from the stacks 356 whereupon the process repeats as above described.

For the avoidance of doubt, it should be stated that FIG. 23 is diagrammatic at least in so far as the reference numerals 354, 304 identify the finger plate and the same one of the eight pots 304 at three different positions, it being understood, of course, that at any one time only one of these three positions can in fact be occupied.

FIG. 24 schematically illustrates, by way of example only, one of a number of alternative embodiments in which the first and/or second-sized pots are not (all) equally spaced. Thus in the embodiment of FIG. 24, the smaller pots 302 are arranged in sets of four while the larger pots 304 are grouped in pairs. As in the previous embodiment, however, the transfer unit 312 operates to load alternate rows of the pots 304 with the plants from the odd-numbered pots 302 and the intervening rows of pots 304 with plants from the even-numbered pots 302.

Lastly, it should be borne in mind that the pot separation, filling and tamping techniques disclosed in this specification could also have application to a direct sticking process.

We claim:

1. Transplanting equipment comprising;
a line of individual plant pick-up devices,
first support means for transversely moving a first row of containers into vertical alignment with said plant pick-up devices,
control means for bringing said plant pick-up devices into one of a plant supporting and plant-releasing mode,
horizontal drive means operative to bring said plant pick-up devices into vertical alignment with containers of a second row having a different centre-to-centre spacing than said containers of said first row,
second support means for transversely moving said second row of containers out of vertical alignment with said plant pick-up devices, and
vertical drive means for moving said plant pick-up devices towards and away from said first and second support means to allow support and release of plants by said plant pick-up devices as determined by said control means.

2. Transplanting equipment as claimed in claim 1 in which each said plant pick-up device comprises a helically-wound probe having a central longitudinal axis.

3. Transplanting equipment as claimed in claim 2 in which said control means comprises a rotary drive operative to rotate said plant pick-up devices about said longitudinal axes a rotational sense to the helix so that said plant pick-up devices support a respective plant and in a contrary rotational sense to the helix so that said plant pick-up devices release a respective plant.

4. Transplanting equipment as claimed in claim 1 in which said plant pick-up devices are interconnected by flexible ties, said drive means, being operative to move said plant pick-up devices between a bunched first configuration wherein said flexible ties are slack and said plant pick-up devices are spaced to correspond to a centre-to-centre container spacing in one of said first and second rows and a second spaced configuration wherein said flexible ties are taut and said plant pick-up devices are spaced to correspond to the centre-to-centre container spacing in the other of said first and second rows.

5. Transplanting equipment as claimed in claim 1 in which adjacent pick-up devices have a predetermined, fixed spacing and said horizontal drive means is operative to move the plant pick-up devices between selected containers in one of said first and second rows and correspondingly spaced containers in the other of said first and second rows.

6. Transplanting equipment as claimed in claim 1 in which said first support means comprises a first endless conveyor disposed transversely to said line of plant pick-up devices at one extreme of horizontal travel and the second support means comprises a second endless conveyor disposed transversely to said line of plant pick-up devices when at the other extreme of horizontal travel.

7. Transplanting equipment as claimed in claim 1 for transplanting plants from containers in said first row into larger sized containers in said second row and includes supply means for introducing particulate material into gaps between root portions of plants and walls of said larger-size containers in said second row.

8. Transplanting equipment as claimed in claim 7 in which said supply means comprises a conveyor operative to convey particulate material over containers in said second row, and displacement means operative to displace particulate material into said containers in said second row.

9. Transplanting equipment as claimed in claim 7 in which said supply means comprises means for introducing a mixture of particulate materials into gaps between root portions of plants and walls of containers of said second row.

10. Transplanting equipment as claimed in claim 7 in which said supply means includes hinged loading chutes which pivot to allow horizontal withdrawal of said second row of containers after receipt of plants therein.

11. Transplanting equipment as claimed in claim 1 in which said containers in each of said first and second rows have a uniform centre-to-centre spacing.

12. Transplanting equipment as claimed in claim 1 including a pot dispenser system comprising a first support means defining a space for a first, bottom pot of a stack of pots, a second support means defining a space for a second, penultimate pot of said stack of pots, and control means operative sequentially to effect engagement of a first bottom pot by said first support means, engagement of the second, penultimate pot by said second support means, disengagement of said first support means from said first, bottom pot to allow said first, bottom pot to fall away from said stack, return of said first support means to a pot-engaging position and release by said second support means of said second, penultimate pot of the stack allowing the stack of pots to drop until said second, penultimate pot is engaged by said first support means.

* * * * *

UNITED STATES PATENT AND TRADEMARK OFFICE
CERTIFICATE OF CORRECTION

PATENT NO. : 4,998,945

DATED : March 12, 1991

INVENTOR(S) : HOLT, et al.

It is certified that error appears in the above-identified patent and that said Letters Patent is hereby corrected as shown below:

Title page: [30] second UK priority is 8915606

FIG. 17, change reference numeral "229" to -- 239 --

Col. 2, line 57, change "Which" to -- which --

Col. 4, line 65, correct "4 to B" to -- 4 to 8 --

Col. 6, line 33, insert a comma between 99 and 100

Col. 6, line 40, insert a comma between 102 and 103

Col. 7, line 29, insert a comma between 169 and 170

Col. 8, line 48, correct "1B" to -- 18 --

UNITED STATES PATENT AND TRADEMARK OFFICE
CERTIFICATE OF CORRECTION

PATENT NO. : 4,998,945

DATED : March 12, 1991

INVENTOR(S) : John B. Holt, et al

It is certified that error appears in the above-identified patent and that said Letters Patent is hereby corrected as shown below:

```
Col. 10, line 24, change reference numeral "229" to -- 239 --
Col. 10, line 43, change "215" to -- 251 --
Col. 11, line 15, change "30B" to -- 308 --
Col. 11, line 59, change "32B" to -- 328 --
Col. 12, line 18, insert a semi-colon after "302"
Col. 12, line 34, insert a semi-colon after "described"
Col. 12, line 65, change "34B" to -- 348 --
Col. 13, line 58, insert --in-- after "axes"
```

Signed and Sealed this

Thirtieth Day of March, 1993

*Attest:*

STEPHEN G. KUNIN

*Attesting Officer*      *Acting Commissioner of Patents and Trademarks*